US005925819A

United States Patent [19]

Yoshinaga et al.

[11] Patent Number: 5,925,819

[45] Date of Patent: Jul. 20, 1999

[54] COMBUSTION MONITORING APPARATUS FOR INTERNAL COMBUSTION ENGINE

[75] Inventors: Tohru Yoshinaga, Okazaki; Tokio Kohama, Nishio; Hiroshi Yorita, Kariya; Yasuyuki Satou, Aichi-ken; Masao Kano, Gamagoori, all of Japan

[73] Assignee: Nippon Soken, Inc., Nishio, Japan

[21] Appl. No.: 08/792,169

[22] Filed: Jan. 30, 1997

Related U.S. Application Data

[63] Continuation-in-part of application No. 08/642,423, May 3, 1996, abandoned.

[30] Foreign Application Priority Data

May 10, 1995 [JP] Japan .................................... 7-137378
May 10, 1996 [JP] Japan .................................... 8-140796

[51] Int. Cl.[6] .................................................... G01M 15/00

[52] U.S. Cl. ......................... 73/117.3; 324/399; 324/402; 73/35.08

[58] Field of Search .................................... 73/116, 117.2, 73/117.3, 118.1, 35.03, 35.06, 35.08; 324/399, 402; 123/419, 425, 436

[56] References Cited

U.S. PATENT DOCUMENTS

| | | | |
|---|---|---|---|
| 4,417,556 | 11/1983 | Latsch . | |
| 4,648,367 | 3/1987 | Gillbrand et al. . | |
| 4,672,324 | 6/1987 | Van Kampen . | |
| 4,825,167 | 4/1989 | Bayba . | |
| 4,947,680 | 8/1990 | McDougal . | |
| 5,068,613 | 11/1991 | Kreft et al. . | |
| 5,207,200 | 5/1993 | Iwata | 123/425 |
| 5,263,452 | 11/1993 | Ohsawa et al. | 123/425 |
| 5,269,282 | 12/1993 | Miyata et al. . | |
| 5,271,268 | 12/1993 | Ikeuchi et al. . | |
| 5,396,176 | 3/1995 | Ishii et al. . | |
| 5,410,253 | 4/1995 | Evans et al. . | |

FOREIGN PATENT DOCUMENTS

| | | |
|---|---|---|
| 58-7536 | 1/1983 | Japan . |
| 63-71581 | 3/1988 | Japan . |
| 5-44624 | 2/1993 | Japan . |
| 5-87036 | 4/1993 | Japan . |
| 5-149230 | 6/1993 | Japan . |

*Primary Examiner*—George Dombroske
*Attorney, Agent, or Firm*—Pillsbury Madison & Sutro LLP

[57] ABSTRACT

A combustion monitoring apparatus for an internal combustion engine is provided which is designed to distinguish abnormal combustion conditions from a normal combustion conditions using a combustion ion current included in a current flowing through plug electrodes of a spark plug, resulting from motion of ions between the plug electrodes which are produced by combustion. For example, if a maximum value of the combustion ion current during one combustion cycle is smaller than a given value, it is determined that a misfire has occurred. If an attenuation time from generation of the current flowing through the plug electrodes until a variation in the current is decreased to a given value is shorter than a given time period, it is determined that a flame has been blown out before combustion is completed.

12 Claims, 16 Drawing Sheets

OSCILLATION SIGNAL

AC VOLTAGE

CAPACITIVE CURRENT

COMBUSTION ION CURRENT

ELECTRODE CURRENT

COMBUSTION MONITORING APPARATUS FOR INTERNAL COMBUSTION ENGINE

This application is a continuation-in-part application of Ser. No. 08/642,423, filed May 3, 1996 abandoned.

BACKGROUND OF THE INVENTION

1. Technical Field

The present invention relates generally to a combustion monitoring apparatus for an internal combustion engine, and more particularly to a combustion monitoring apparatus designed to distinguish an abnormal combustion condition from a normal combustion condition using a combustion ion current resulting from motion of ions between plug electrodes of a spark plug which are produced by combustion of an internal combustion engine.

2. Background of Related Art

An internal combustion engine for an automotive vehicle usually uses a spark plug to establish an arc between plug electrodes for igniting an air-fuel mixture injected into a combustion chamber. Upon the ignition of the mixture, combustion begins and spreads in all directions from the spark plug within the combustion chamber to produce an engine power. Combustion conditions are constantly changed according to traveling conditions of the vehicle. A conventional engine control system, thus, monitors generation of abnormal combustion in order to control ignition timing of a spark plug and an air/fuel ratio for maintaining a proper combustion condition at all times. For example, abnormal combustion called combustion knock results in loss of power and in excessive increase in combustion chamber pressure, causing physical damage to the engine. In order to avoid this abnormal combustion, a knocking sensor is in general use which is mounted in a combustion chamber to detect generation of an abnormal vibration caused by combustion knock for retarding ignition timing. The knocking sensor, however, may detect vibrations produced by factors other than the combustion knock. In order to avoid this drawback, Japanese Patent First Publication No. 58-7536 teaches a knocking detecting apparatus which applies a dc voltage to plug electrodes of a spark plug to detect an ion current resulting from motion of ions between the plug electrodes for determining the strength of combustion based on the fact that a large number of ions are produced upon generation of detonation causing the combustion knock.

Usually, in order to improve fuel consumption or control exhaust emissions, an air/fuel ratio is shifted to a lean side or an exhaust gas is recirculated to purge nitrogen oxides contained in the exhaust gas. These, however, may induce unstable combustion such as a misfire and combustion knock. It is, thus, essential to control combustion conditions properly, and the combustion conditions need to be detected with high accuracy.

In the above prior art knocking detecting apparatus, it is difficult to detect only the ion current because of influence of charging and discharging currents flowing through the plug electrodes functioning as capacitive elements. Moreover, a dc high voltage applied to the plug electrodes causes combustion ions to be absorbed by the plug electrodes, so that the ion current becomes unstable, thereby decreasing the accuracy in detecting the abnormal combustion conditions.

SUMMARY OF THE INVENTION

It is therefore a principal object of the present invention to avoid the disadvantages of the prior art.

It is another object of the present invention to provide a combustion monitoring apparatus which is designed to detect generation of combustion ions for analyzing combustion conditions of an internal combustion engine and to provide information useful in maintaining the combustion conditions at a desired level.

According to one aspect of the present invention, there is provided a combustion monitoring apparatus for an internal combustion engine which comprises a voltage source means for applying an ac voltage across plug electrodes of a spark plug mounted in a combustion chamber of the engine during combustion, a current detecting means for detecting a current flowing through the plug electrodes of the spark plug, a current variation determining means for determining a variation in the current detected by the current detecting means caused by a variation in number of combustion ions produced between the plug electrodes of the spark plug, and a combustion condition distinguishing means for distinguishing an abnormal combustion condition from a normal combustion condition based on the variation in the current determined by the current variation determining means.

In the preferred mode of the invention, the combustion condition distinguishing means includes a maximum value determining means, a comparing means, and a misfire determining means. The maximum value determining means determines a maximum value of the variation in the current detected by the current detecting means during a combustion cycle. The comparing means compares the maximum value determined by the maximum value determining means with a given value. The misfire determining means determines that a misfire has occurred if the maximum value is smaller than the given value.

The combustion condition distinguishing means may include a time measuring means and a blowout determining means. The time measuring means measures a time from generation of the current detected by the current detecting means until the variation in the current is decreased to a given value. The blowout determining means determines that a flame has been blown out before combustion is completed if the time measured by the time measuring means is shorter than a given time period.

The combustion condition distinguishing means may include a maximum value determining means a time measuring means, and a combustion knock determining means. The maximum value determining means determines a maximum value of the variation in the current detected by the current detecting means during a combustion cycle. The time measuring means measures a time from generation of the current detected by the current detecting means until the variation in the current is decreased to a given value. The combustion knock determining means determines that combustion knock is occurring if a quotient of the maximum value of the variation divided by the time measured by the time measuring means is greater than a predetermined value.

The combustion condition distinguishing means may include a maximum value determining means and a combustion knock determining means. The maximum value determining means determines a maximum value of the variation in the current detected by the current detecting means during a combustion cycle. The combustion knock determining means determines that combustion knock is occurring if the maximum value of the variation in the current is greater than a predetermined value.

The combustion condition distinguishing means may include a maximum attenuation rate determining means and a combustion knock determining means. The maximum attenuation rate determining means determines a maximum value of an attenuation rate of the variation in the current detected by the current detecting means during a combustion cycle. The combustion knock determining means determines that combustion knock is occurring if the maximum value of the attenuation rate is greater than a predetermined value.

The combustion condition distinguishing means may include a knocking vibration detecting means and a combustion knock determining means. The knocking vibration detecting means extracts a knocking vibration component caused by combustion knock out of the variation in the current determined by the current variation determining means to determine a maximum amplitude of the knocking vibration component. The combustion knock determining means determines that combustion knock is occurring if the maximum amplitude is greater than a predetermined amplitude.

The combustion condition distinguishing means may include a knocking vibration detecting means and a combustion knock determining means. The knocking vibration detecting means extracts a knocking vibration component caused by combustion knock out of the variation in the current determined by the current variation determining means to count the number of times peaks of the knocking vibration component exceeds a given amplitude during a combustion cycle. The combustion knock determining means determines that combustion knock is occurring if the number of times counted is greater than a given number.

According to another aspect of the invention, there is provided a combustion monitoring apparatus for an internal combustion engine which comprises a voltage source applying an ac voltage across plug electrodes of a spark plug mounted in a combustion chamber of the engine; a current detecting element detecting a current flowing through the plug electrodes of the spark plug to provide a current signal indicative thereof; a combustion ion detecting element extracting a combustion ion current component out of the current signal provided by the current detecting element by removing a capacitive current component produced according to the ac voltage provided by the voltage source to provide a combustion ion signal according to the number of combustion ions existing between the plug electrodes; and a combustion analyzing circuit analyzing a combustion condition of the engine based on a variation in combustion ion signal provided by the combustion ion detecting element.

In the preferred mode of the invention, the combustion analyzing circuit includes a knocking vibration detector, an upper limit comparator, a knocking amplitude maximum value determining circuit, and a knocking determining circuit. The knocking vibration detector detects from the combustion ion signal a vibration within a frequency range of combustion knock vibrations. The upper limit comparator compares the combustion ion signal with a given upper limit to determine whether the combustion ion signal is greater than the given upper limit or not. The knocking amplitude maximum value determining circuit determines a maximum value of amplitude of the vibration detected by the knocking vibration detector within a period of time including at least a period of time during which the combustion ion current exceeds the given upper limit. The knocking determining circuit determines that combustion knock is occurring when the upper limit comparator determines that the combustion ion signal is greater than the given upper limit to determine the strength of the combustion knock based on the maximum value of the amplitude of the vibration determined by the knocking amplitude maximum value determining circuit.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
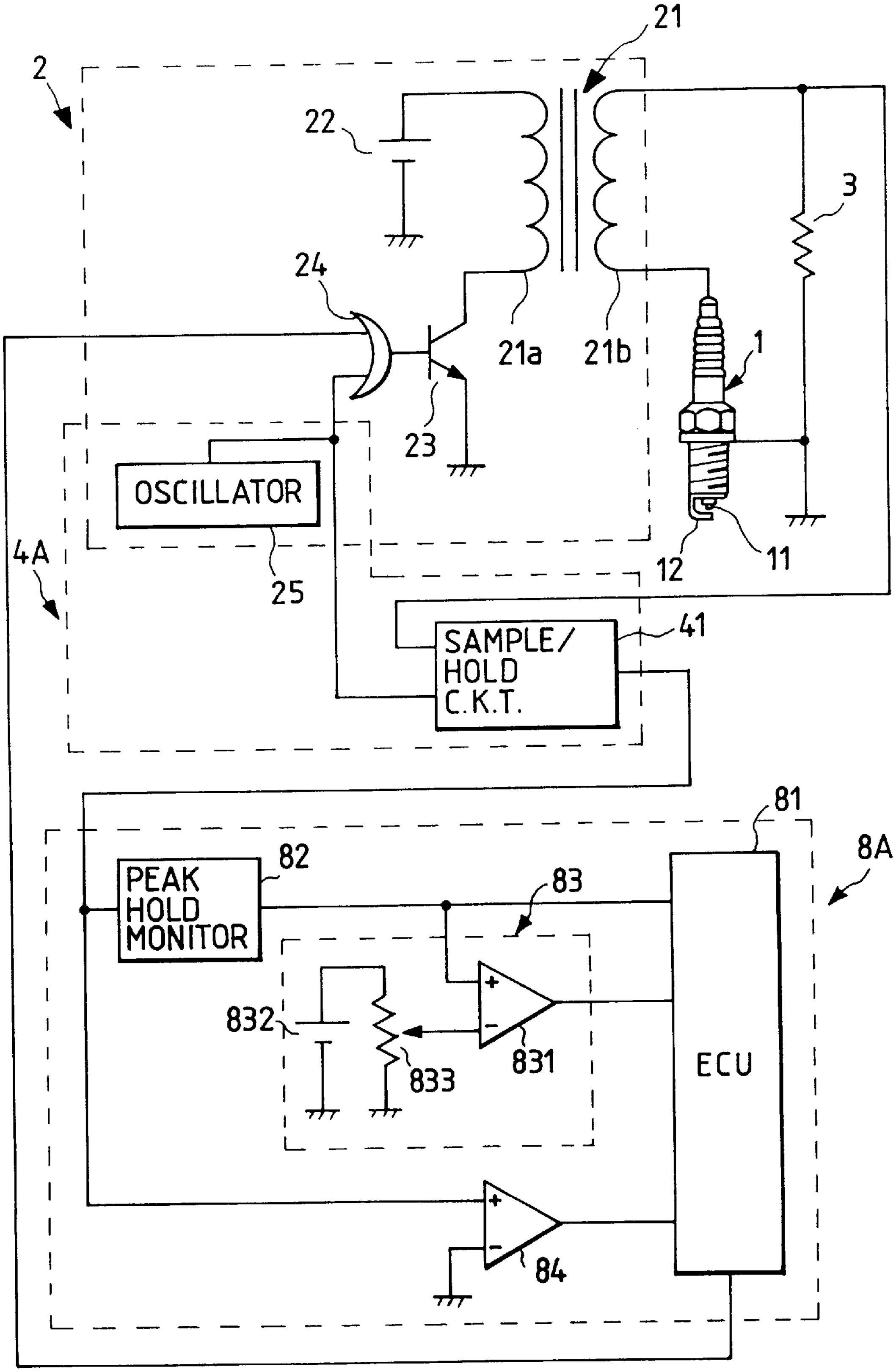
FIG. 1 is a circuit diagram which shows a combustion monitoring apparatus according to the first embodiment of the invention.

Referring now to the drawings, particularly to FIG. 1, there is shown a combustion monitoring apparatus according to the present invention which is designed to distinguish abnormal combustion conditions from a normal combustion condition of an internal combustion engine. The abnormal combustion conditions, as detected by the combustion monitoring apparatus of this invention, are divided into three types: one resulting from a failure in establishing an arc across plug electrodes of a spark plug (hereinafter, referred to as a complete misfire), the second being incomplete combustion wherein an arc is produced to ignite an air-fuel mixture, but a flame is quenched before the combustion is completed due to an excessive mixture richness, for example, (hereinafter, referred to as a blowout), and the third being combustion knock (also called engine knock).

The combustion monitoring apparatus includes generally an ac voltage source circuit 2, a current waveform detecting circuit 4A, and an electronic control circuit 8A.

The ac voltage source circuit 2 includes a transformer 21, a storage battery 22, a switching transistor 23, a two-input OR gate 24, and an oscillator 25.

A spark plug 1 having two electrodes 11 and 12 is mounted in a combustion chamber of the engine. The electrode 12 is grounded through the shell of the spark plug. The electrode 11 is a central electrode insulated with porcelain, mica, or other materials. The transformer 21 includes a primary winding 21*a* and a secondary winding 21*b*. The secondary winding 21*b* is connected to the electrode 11 of the transformer 21. The primary winding 21*a* is connected at one end to a positive terminal of the battery 22 and at the other end to a collector of the switching transistor 23 for selectively establishing the application of voltage to the primary winding 21*a*. The oscillator 25 is connected to a base of the switching transistor 22 through the OR gate 24 and produces a rectangular signal or oscillation signal having a frequency of 30 kHz.

A resistor 3 is disposed between the secondary winding 21 and the electrode 12 of the spark plug 1 for detecting current flow through the electrodes 11 and 12. The resistor 3 is also connected at a junction with the secondary winding 21*b* to a sample and hold circuit 41 of the current waveform detecting circuit 4A.

The electronic control circuit 8A includes an electronic control unit (ECU) 81, a peak hold monitor 82, a lower limit comparing circuit 83, and a comparator 84. The lower limit comparing circuit 83 includes a comparator 831, a variable resistor 833, and a battery 832.

The sample and hold circuit 41 provides an output signal to the peak hold monitor 82. A value held by the peak hold monitor 82 is reset at the start of every combustion cycle. The peak hold monitor 82 provides an output signal to a positive input terminal of the comparator 831. The comparator 831 is connected at a negative input terminal to the variable resistor 833. The variable resistor 833 is so adjusted that a voltage drop of the battery 832 corresponds to a lower limit of a peak value of a given combustion ion current. The comparator 831 provides an output signal to the ECU 81.

The sample and hold circuit 14 also provides the output signal to a positive terminal of the comparator 84. A negative terminal of the comparator 84 is connected to ground. An output signal of the comparator 84 is inputted to the ECU 81 for use in determining generation of the blowout. An output signal of the peak hold monitor 82 is inputted to the ECU 81 for use in determining generation of the combustion knock.

The spark plug 1 and part of the ac voltage source circuit 2 serve to ignite an air-fuel mixture introduced into the combustion chamber of the engine. The electronic control circuit 8A is connected to the OR gate 24 and outputs an ignition signal at a high level to turn on the switching transistor 23 through the OR gate 24 so that ignition energy is supplied from the battery 22 and then accumulated in the transformer 21. When the ignition signal is changed from the high level to the low level, it causes the transformer 21 to induce the electromagnetic induction so that a high voltage appears across the electrodes 11 and 12 of the spark plug 1 to produce an arc for igniting the air-fuel mixture.

In operation of the combustion monitoring apparatus, when the oscillator 25 outputs the oscillation signal to the base of the switching transistor 23 through the OR gate 24 during combustion of the air-fuel mixture, it will cause the battery voltage to be applied to the primary winding 21*a* of the transformer 21 cyclically, thereby establishing the electromagnetic induction to develop a high ac voltage at the secondary winding 21*b* at a frequency equal to that of the oscillation signal outputted from the oscillator 25, which is, in turn, applied across the electrodes 11 and 12 of the spark plug 1.

Figures 3A, 3B, 3C, 3D, 3E:
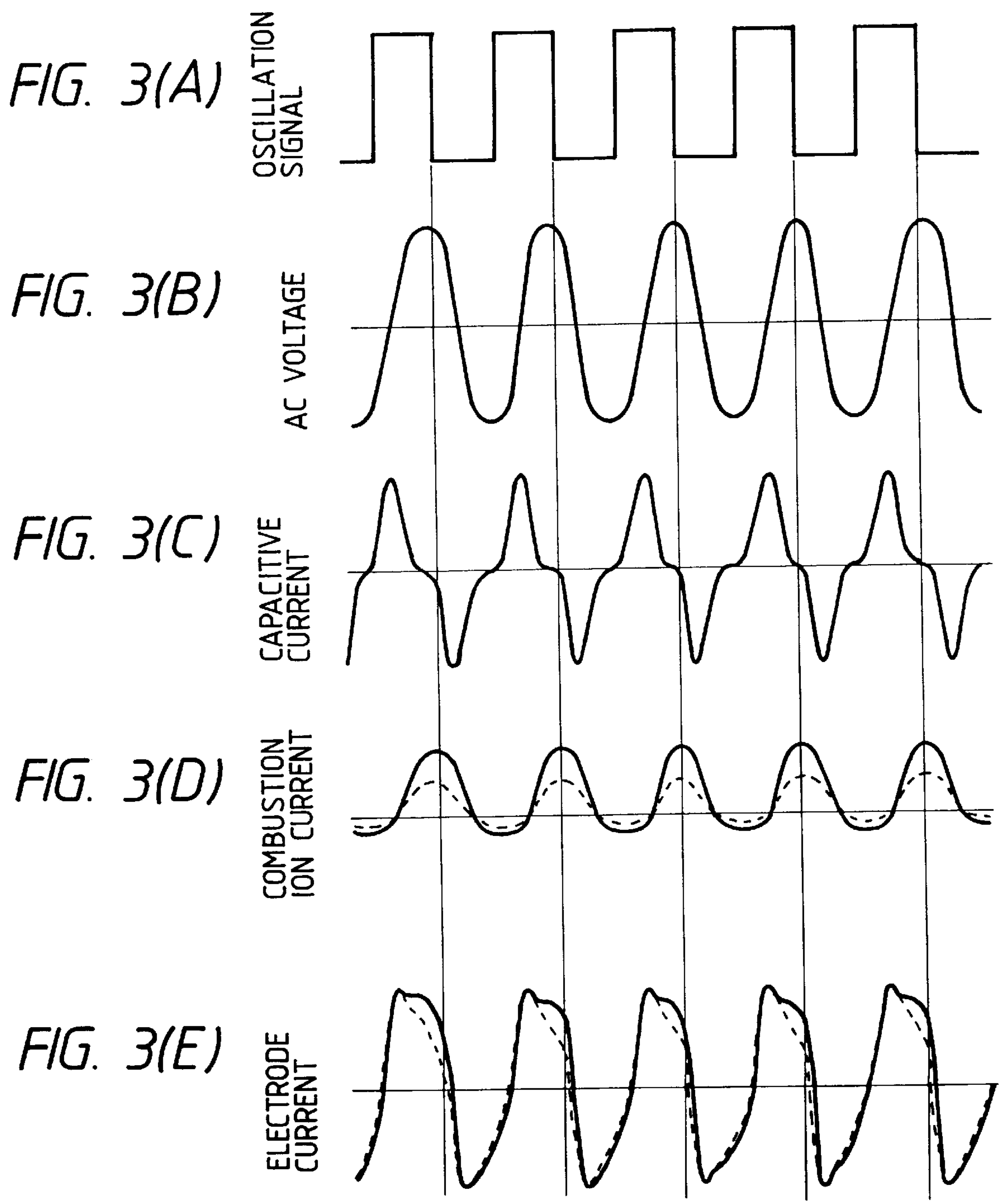
FIG. 3(A) shows a waveform of a pulse signal outputted from an oscillator 25.
FIG. 3(B) shows a waveform of an ac voltage applied to plug electrodes of a spark plug.
FIG. 3(C) shows a waveform of a capacitive current component of a current flowing through plug electrodes of a spark plug.
FIG. 3(D) shows waveforms of combustion ion currents when a large number of ions are produced and when a small number of ions are produced.
FIG. 3(E) shows waveforms of currents flowing through plug electrodes of a spark plug when a large number of ions are produced and when a small number of ions are produced.

FIG. 3(A) shows a waveform of the oscillation signal outputted from the oscillator 25. FIG. 3(B) shows a waveform of the ac voltage applied across the electrodes 11 and 12 of the spark plug 1 during combustion. The ac voltage blunts in waveform as compared with the oscillation signal shown in FIG. 3(A) and is approximately 90° out of phase with the oscillation signal due to stray capacitance of the switching transistor 23, the transformer 21, etc.

The ac voltage applied to the electrodes 11 and 12 produces a current flow therethrough. FIG. 3(C) shows a capacitive component of the current flowing through the electrodes 11 and 12 which is in proportion to a timedifferential of the ac voltage shown in FIG. 3(B). FIG. 3(D) shows combustion ion currents resulting from motion of ions between the electrodes 11 and 12 which are produced by combustion. A solid line represents the combustion ion current when a great number of ions are generated, while a broken line represents the combustion ion current when a small number of ions are generated. More combustion ion current flows, as can be seen from the drawing, on a positive side than on a negative side. This is because negative combustion ions are much smaller than positive combustion ions. The combustion ion current vibrates with amplitude proportional to the number of combustion ions in phase with the ac voltage developed across the electrodes 11 and 12 of the spark plug 1, as shown in FIG. 3(B). The sum of the capacitive current and the combustion ion current forms a current actually flowing through the electrodes 11 and 12 which is shown in FIG. 3(E). The capacitive current represents a zero level when the oscillation signal in FIG. 3(A) is changed from the H-level to the L-level, while the combustion ion current represents a peak value on the positive side. The current flowing through the electrodes 11 and 12 is detected as a voltage drop across the resistor 3 which is proportional to a level of the current. The detected voltage drop is then inputted to the sample and hold circuit 41. The sample and hold circuit 41 holds a signal inputted when the oscillation signal from the oscillator 25 is changed from the H-level to the L-level.

A signal held by the sample and hold circuit 41 indicates the peak value of the combustion ion current which is increased and decreased only according to a change in number of ions regardless of a periodic change of the ac voltage, as shown in FIG. 3(B).

An operation of the electronic control circuit 8A for waveform analysis will be discussed below.

Figure 4A:
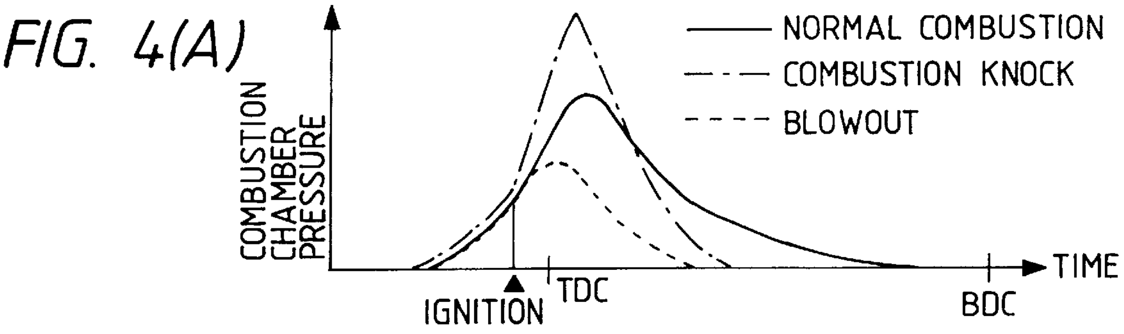
FIG. 4(A) shows variations in combustion chamber pressure during one combustion cycle.

FIG. 4(A) shows variations in combustion chamber pressure of the engine during one combustion cycle. A solid line represents normal combustion. A chain line represents abnormal combustion causing the combustion knock. A broken line represents abnormal combustion caused by the blowout. In all cases, the combustion chamber pressure increases after ignition and then decreases after a maximum level is reached, however, as compared with the normal combustion, the combustion chamber pressure during the combustion knock rises rapidly until a maximum level is reached and then drops rapidly because detonation takes place during the combustion knock. In the case of the blowout, the combustion is attenuated and a flame is blown out during an expansion process, so that the combustion chamber pressure begins to decrease earlier than normal.

Figure 4B:
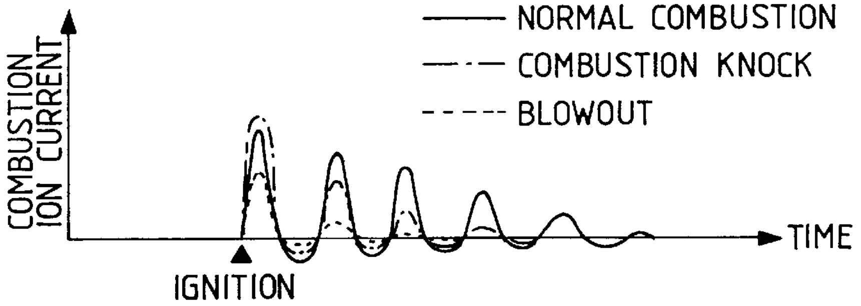
FIG. 4(B) shows variations in combustion ion current during one combustion cycle.

FIG. 4(B) shows variations in combustion ion current during the same combustion cycle as shown in FIG. 4(A) which vibrate in a cycle corresponding to the frequency of the ac voltage, as applied across the electrodes 11 and 12 of the park plug 1. The combustion ion current is, as described above, changed only according to a change in number of combustion ions. A peak value of the combustion ion current during each cycle is detected by the sample and hold circuit 41.

Figure 4C:
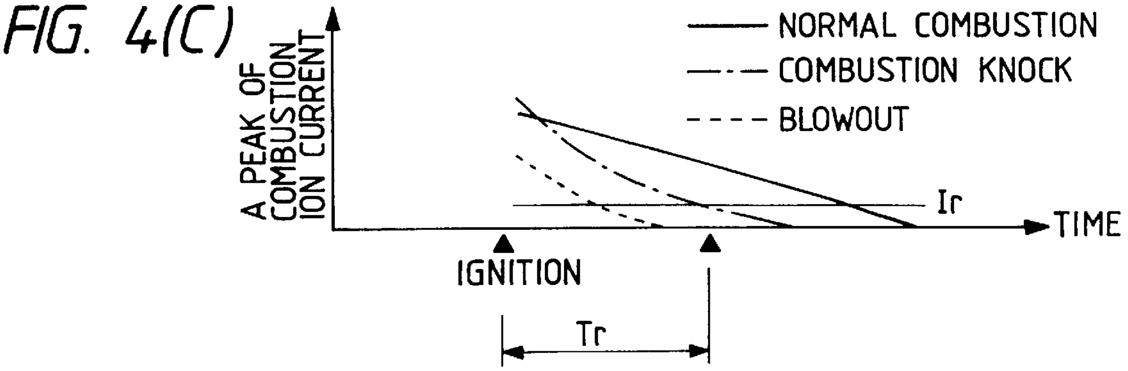
FIG. 4(C) shows variations in peak value of combustion ion currents.

FIG. 4(C) shows variations in peak value of the combustion ion currents shown in FIG. 4(B), respectively. If a misfire has occurred, the combustion does not take place, so that a peak value of the combustion ion current indicates substantially zero. Thus, when the peak value of the combustion ion current is smaller than a given lower limit Ir, the electronic control circuit 81 determines that the misfire has occurred. If the blowout has taken place, combustion is completed earlier than normal. Thus, when a combustion time from ignition to quench is shorter than a minimum of a combustion time under a normal combustion condition, the electronic control circuit 81 determines that the blowout has taken place. If combustion knock occurs, a maximum of peak values of the combustion ion current during one combustion process is greater than that during the normal combustion condition, and a combustion time TR becomes shorter than that under the normal combustion condition. Thus, when a quotient of the maximum of the peak values of the combustion ion current during one combustion cycle divided by the combustion time TR, which represents a mean combustion rate, is greater than a maximum of that under the normal combustion condition, the electronic control circuit 81 determines that the combustion knock is occurring.

Referring back to FIG. 2, there is shown a flowchart of a program or sequence of logical steps performed by the electronic control circuit 81 every combustion cycle.

After entering the program, the routine proceeds to step 101 wherein it is determined whether the electronic control circuit 8A has outputted a start signal to the oscillator 25 or not. The start signal is provided upon completion of ignition of the spark plug 1 or after a given period of time from the ignition. If a YES answer is obtained, then the routine proceeds to step 102 wherein a maximum value Ip of a combustion ion current in one combustion cycle is determined by the peak hold monitor 82 at the end of the combustion cycle. Specifically, the combustion ion current detected by the sample and hold circuit 41 through the resistor 3 is, as described above, changed cyclically after ignition, so that a signal level outputted from the sample and hold circuit 41 to the peak hold monitor 82 is changed. The peak hold monitor 82 fixes the maximum value Ip of the combustion ion current at the end of the combustion cycle.

The output from the peak hold monitor 82 is supplied to the positive (+) input terminal of the comparator 831, while a reference voltage corresponding to the lower limit Ir of the combustion ion current is inputted from the variable resistor 833 to the negative (−) terminal of the comparator 831. In step 103, the comparator 831 determines whether the maximum value Ip of the combustion ion current is smaller than the lower limit Ir or not. If the maximum value Ip is smaller than the lower limit If, then the comparator 831 provides a signal at the L level, and the routine proceeds to step 109 wherein it is determined that a complete misfire has occurred. Alternatively, if the maximum value Ip is greater than the lower limit Ir, then the comparator 831 provides a signal at the H-level, and the routine proceeds to step 104 wherein a combustion time TR is determined in the following manner. The output of the sample and hold circuit 41 representing a peak value of the combustion ion current is inputted to the positive input terminal of the comparator 84. The comparator 84 then compares the peak value of the combustion ion current with a reference voltage (i.e., ground potential) inputted to the negative terminal thereof. The output from the sample and hold circuit 41 representing the peak value of the combustion ion current shows a positive value after ignition and reaches zero when combustion is completed to change an output from the comparator 84 from the H-level to the L-level. The time at which the output from the comparator 84 is changed to the L-level corresponds to the time when the peak value of the combustion ion current is decreased to a given value. A period of time from rising of the output from the sample and hold circuit 41 to the H-level until it is changed to the L-level is determined as the combustion time TR.

After the combustion time TR is determined in step 104, the routine proceeds to step 105 wherein it is determined whether the combustion time TR is smaller than a given value Tr or not. The given value Tr is stored in a memory of the electronic control circuit 81 and represents, for example, as shown in FIG. 4(C), the elapsed time until the peak value of the combustion ion current under combustion knock conditions reaches the lower limit Ir. If a YES answer is obtained meaning that the combustion time TR is smaller than the given value Tr, then the routine proceeds to step 110 wherein it is determined that the engine is in the abnormal combustion condition caused by the blowout. Alternatively, if a NO answer is obtained in step 105, then the routine proceeds to step 106 wherein the maximum value Ip of the combustion ion current is divided by the combustion time TR to determine a combustion rate VR (i.e., a combustion attenuation velocity).

The routine then proceeds to step 107 wherein it is determined whether the combustion rate VR is greater than a given value Vr or not. If a YES answer is obtained, then the routine proceeds to step 111 wherein it is determined that the engine is in the abnormal combustion condition causing combustion knock. Alternatively, if a NO answer is obtained in step 107, then the routine proceeds to step 108 wherein it is determined that the engine is in the normal combustion condition.

As apparent from the above discussion, the combustion monitoring apparatus of this embodiment is designed to distinguish the abnormal combustion conditions based on a variation in the combustion ion current as a function of a variation in number of combustion ions.

Figure 5:
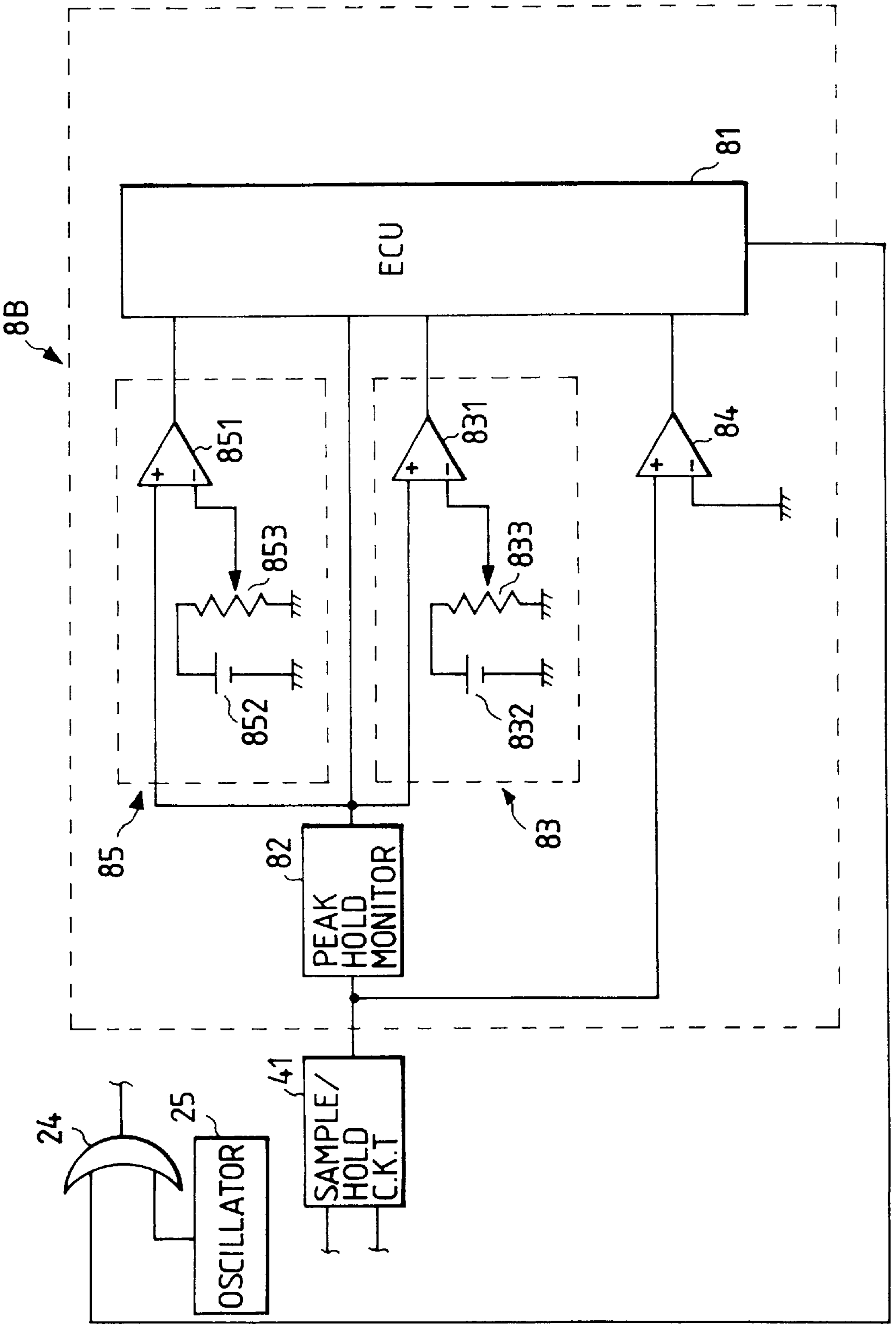
FIG. 5 is a circuit diagram which shows a combustion monitoring apparatus according to the second embodiment.

FIG. 5 shows an electronic control circuit 8B of a combustion monitoring apparatus according to the second embodiment of the invention. Other arrangements are the same as in the first embodiment, and explanation thereof in detail will be omitted here.

The electronic control circuit 8B is different from the electronic control circuit 8A of the first embodiment only in that an upper limit comparing circuit 85 to which an output from the peak hold monitor 82 is inputted is provided.

The upper limit comparing circuit 85 includes a comparator 851, a variable resistor 853, and a battery 852. An output of the peak hold monitor 82 is inputted into a positive input terminal of the comparator. An output of the comparator 851 is inputted into the electronic control unit 81 for use in determining a combustion knock condition. A negative input terminal of the comparator 851 is connected to the variable resistor 853. The variable resistor 853 is so adjusted as to produce a battery voltage drop corresponding to an upper limit of a variation in peak value of the combustion ion current during normal combustion. If a peak value of the combustion ion current under some combustion condition is below the upper limit, it is determined that the engine is in normal combustion conditions. Alternatively, if the peak value of the combustion ion current exceeds the upper limit, it is determined that the engine is in an abnormal combustion condition causing combustion knock.

Figure 2:
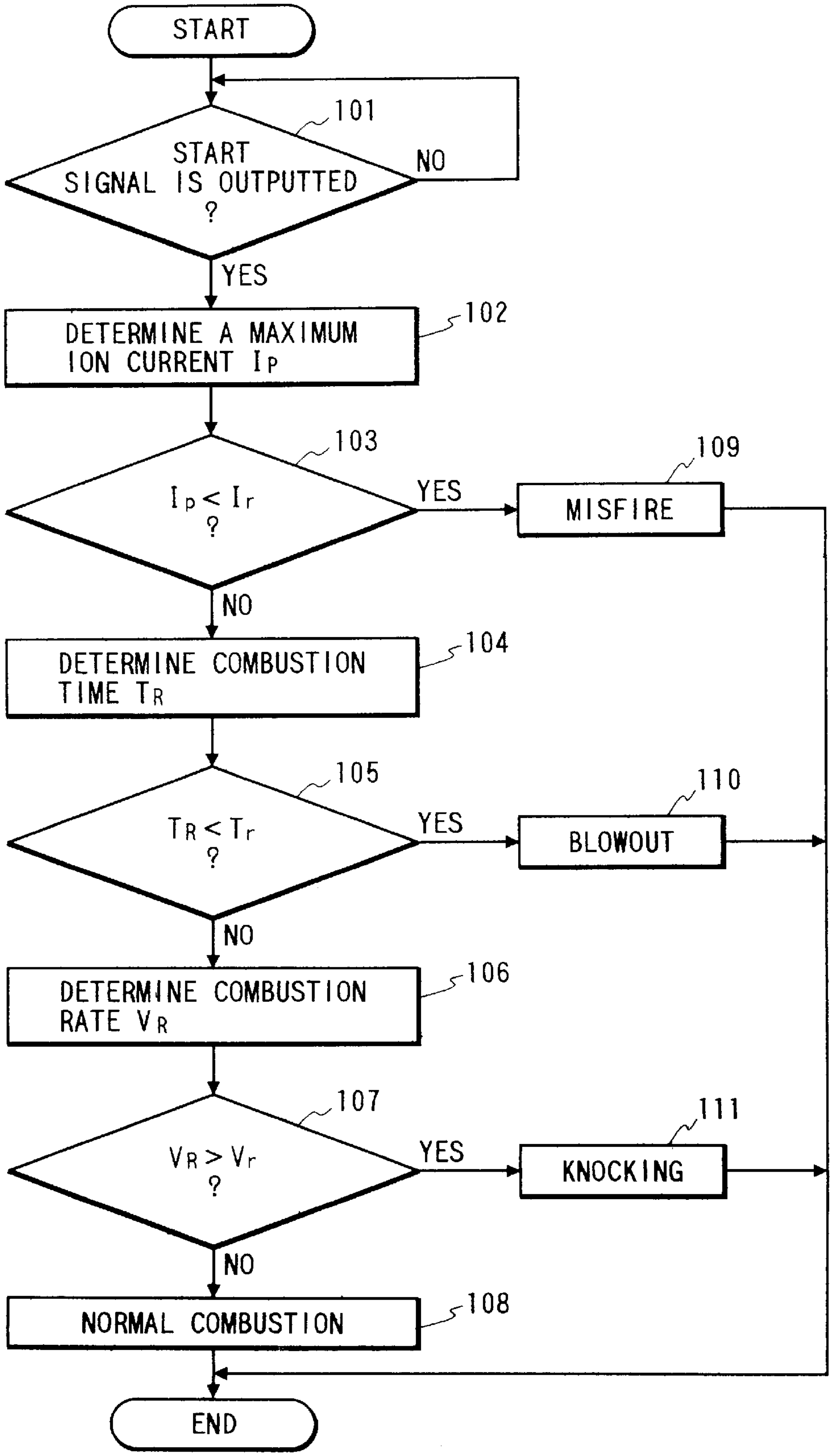
FIG. 2 is a flowchart of a program performed by a combustion monitoring apparatus for distinguishing abnormal combustion conditions from a normal combustion condition.

An operation of the combustion monitoring apparatus of the second embodiment will be discussed below using the flowchart shown in FIG. 2. The operation of the second embodiment is different from that of the first embodiment only in steps 106 and 107. Other steps are identical, and explanation thereof in detail will be omitted here.

The peak hold monitor 82, as described in the first embodiment, fixes the maximum value Ip of the combustion ion current at the end of a combustion cycle (step 106). The maximum value Ip is inputted to the positive input terminal of the comparator 851. To the negative input terminal of the comparator 851, the upper limit Ipth which is, as described above, a criterion for determining whether the engine is in the normal combustion condition or the combustion knock condition, is inputted from the variable resistor 853. The comparator 851 compares the maximum value Ip with the upper limit Ipth (step 107). If the maximum value Ip is greater than the upper limit Ipth, it is determined that the engine is in the combustion knock condition (step 111). Alternatively, if the maximum value Ip is smaller than the upper limit Ipth, it is determined that the engine is in the normal combustion condition (step 108).

Figure 6:
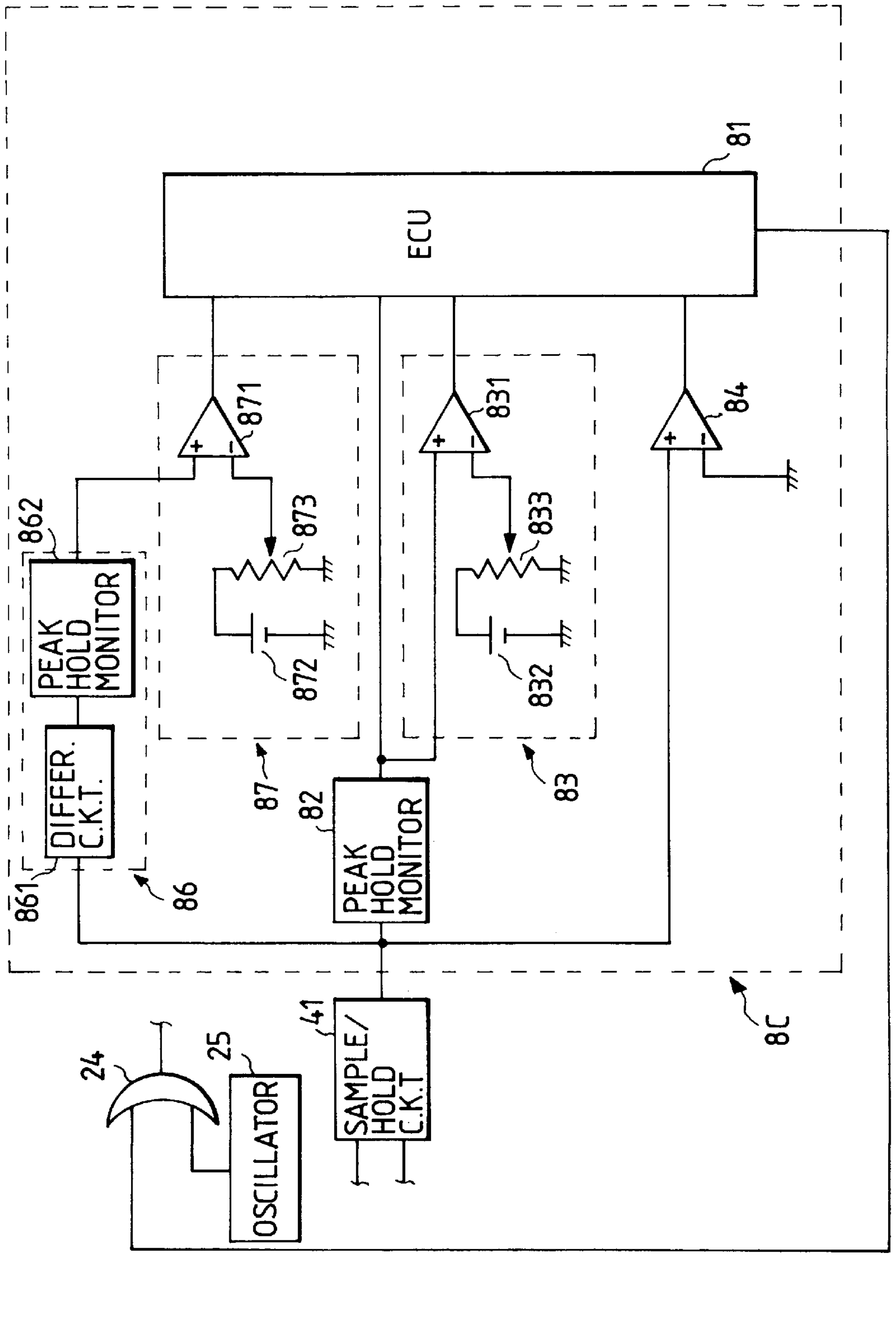
FIG. 6 is a circuit diagram which shows a combustion monitoring apparatus according to the third embodiment.

FIG. 6 shows an electronic control circuit 8C of a combustion monitoring apparatus according to the third embodiment of the invention, which is different from the second embodiment of FIG. 5 in that a maximum attenuation rate determining circuit 86 and an attenuation rate comparing circuit 87 are provided. Other arrangements are identical, and explanation thereof in detail will be omitted here.

The maximum attenuation rate determining circuit 86 includes a differentiating circuit 861 and a peak hold monitor 862. The attenuation rate comparing circuit 87 includes a comparator 871, a variable resistor 873, and a battery 872.

The output from the sample and hold circuit 41 is inputted to the peak hold monitor 862 through the differentiating circuit 861. A value held by the peak hold monitor 862 is reset at the start of every combustion cycle. The peak hold monitor 862 provides an output to a positive input terminal of the comparator 871. A negative input terminal of the comparator 871 is connected to the variable resistor 873. The variable resistor 873 is so adjusted as to produce a battery voltage drop corresponding to a given maximum attenuation rate Vmaxr. Usually, the combustion process during knocking is completed faster than normal, so that an attenuation rate of a peak value of the combustion ion current is high. Thus, if an attenuation rate of a peak value of the combustion ion current under some combustion condition is below the maximum attenuation rate Vmaxr, it is determined that the engine is in normal combustion conditions. Alternatively, if the attenuation rate is greater than the maximum attenuation rate Vmaxr, it is determined that the engine is in an abnormal combustion condition causing combustion knock.

Operations of the maximum attenuation rate determining circuit 86 and the attenuation rate comparing circuit 87 will be discussed below. Other operations are identical with those of the second embodiment, and explanation thereof in detail will be omitted here.

The differentiating circuit 861 differentiates an output from the sample and hold circuit 41 with respect to time and provides an output signal proportional to an attenuation rate of a peak value of the combustion ion current. The peak hold monitor 862 holds or updates the output signal from the differentiating circuit 861 according to a variation in the attenuation rate of the peak value and determines a maximum value VmaxR of the attenuation rate at the end of every combustion cycle. The comparator 871 compares the maximum value VmaxR with the maximum attenuation rate Vmaxr provided by the variable resistor 873. If the maximum value VmaxR is greater than the maximum attenuation rate Vmaxr, it is determined that the engine is in the knocking condition. Alternatively, if the maximum value VmaxR is smaller than the maximum attenuation rate Vmaxr, it is determined that the engine is in the normal combustion condition.

Figure 7:
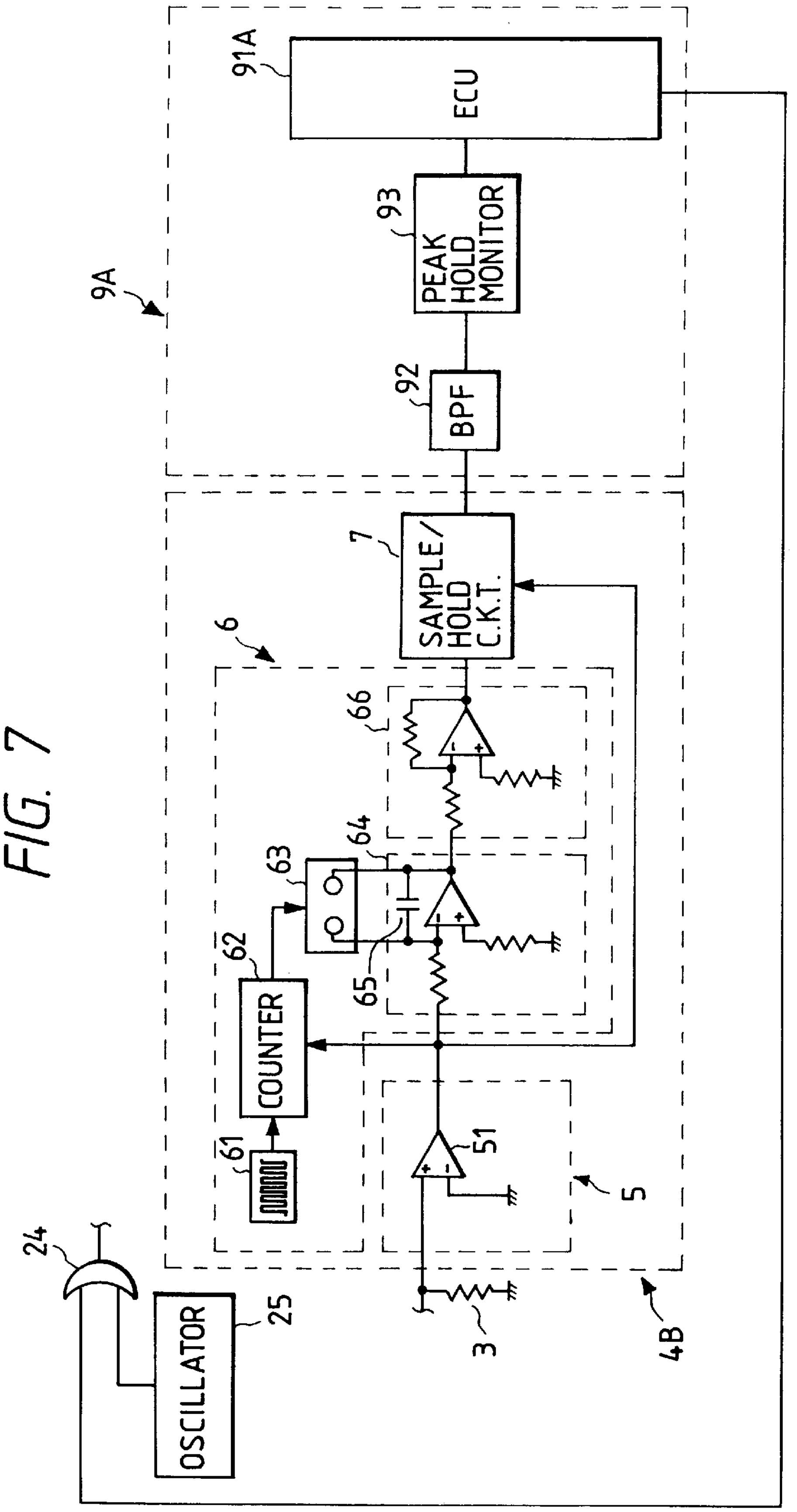
FIG. 7 is a circuit diagram which shows a combustion monitoring apparatus according to the fourth embodiment.

FIG. 7 shows a combustion monitoring apparatus according to the fourth embodiment of the invention which includes a current waveform detecting circuit 4B and an electronic control circuit 9A in place of the current waveform detecting circuit 4A and the electronic control circuit 8A of the first embodiment. The same oscillator 25 as in the first embodiment which connects with the OR gate 24 is, however, provided independent of the current waveform detecting circuit 4A. Other arrangements are identical, and explanation thereof in detail will be omitted here.

The current waveform detecting circuit 4B includes a signal converter circuit 5, a time measuring circuit 6, and a sample and hold circuit 7.

The time measuring circuit 6 includes an oscillator 61, a counter 62, an analog switch 63, an integrating circuit 64, and an inverting circuit 66.

A voltage drop developed across the resistor 3 is inputted to the integrating circuit 64 through the signal converter circuit 5. The oscillator 61 provides an oscillation signal to the analog switch 63 through the counter 62. The analog switch 63 is connected to both sides of a capacitor 65 of the integrating circuit 64 and provides a reset signal to define an integration interval in an integration operation performed by the integrating circuit 64. The integrating circuit 64 provides an integration signal to the sample and hold circuit 7 through the inverting circuit 66. The sample and hold circuit 7 holds the integration signal and updates it when a signal from the comparator 51 is changed from the H-level to the L-level. An output of the sample and hold circuit 7 is inputted to a band-pass filter 92 of the electronic control circuit 9A for determining a knocking vibration. The band-pass filter 92 provides an output to a peak hold monitor 93 for determining a maximum amplitude of the knocking vibration. The peak hold monitor 93 is reset at the start of every combustion cycle. An output of the peak hold monitor 93 is inputted to an electronic control unit 91A.

An operation of the combustion monitoring apparatus of the fourth embodiment will be described below with reference to FIGS. 7 and 8. The same operation as that of the first embodiment will be omitted here.

Figures 8A, 8B, 8C, 8D, 8E, 8F, 8G, 8H:
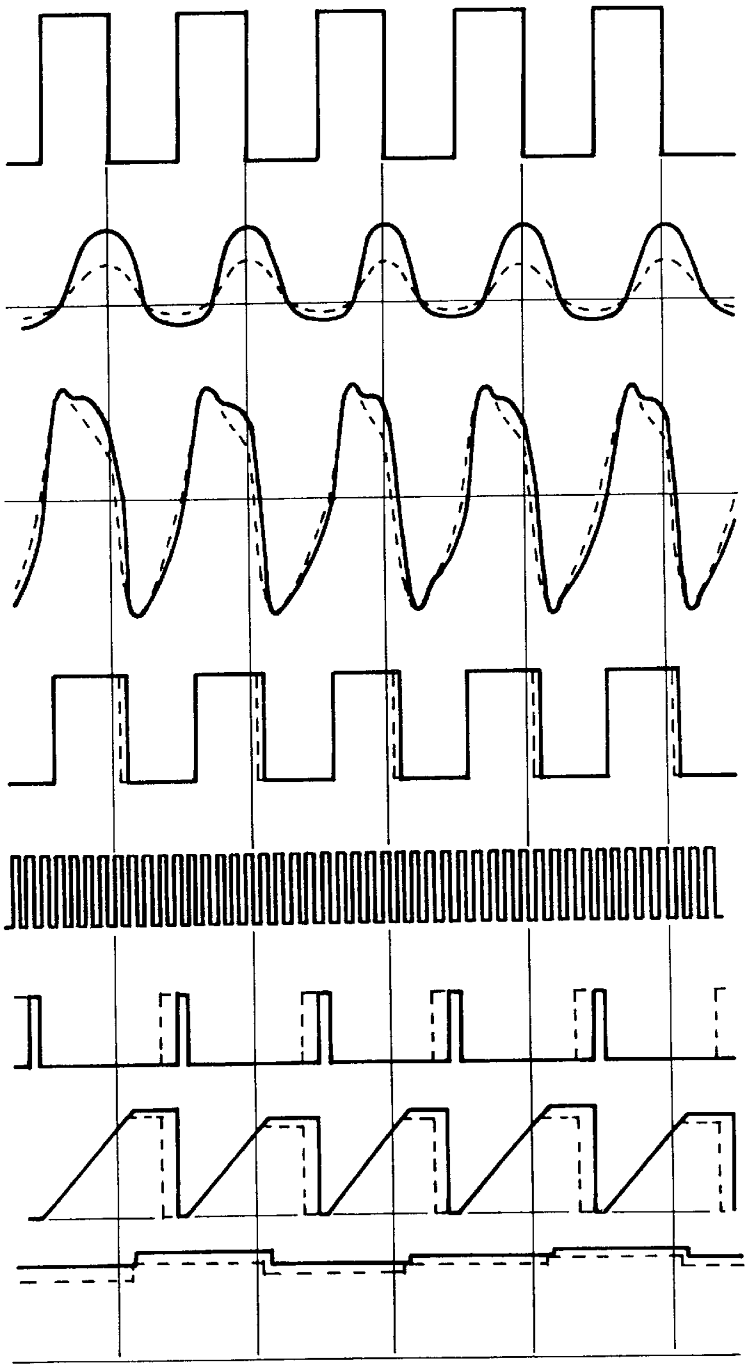
FIG. 8(A) shows a waveform of a pulse signal outputted by an oscillator 25 shown in FIG. 7.
FIG. 8(B) shows waveforms of combustion ion currents when a large number of ions are produced and when a small number of ions are produced.
FIG. 8(C) shows waveforms of currents flowing through plug electrodes of a spark plug when a large number of ions are produced and when a small number of ions are produced.
FIG. 8(D) shows a waveform of an output of a comparator 51 shown in FIG. 7.
FIG. 8(E) shows a waveform of an output of an oscillator 61 shown in FIG. 7.
FIG. 8(F) shows a waveform of an output of a counter 62 shown in FIG. 7.
FIG. 8(G) shows a waveform of an output of an inverting circuit 66 shown in FIG. 7.
FIG. 8(H) shows a waveform of an output of a sample and hold circuit 7 shown in FIG. 7.

When the oscillator 25 provides a pulse signal, as shown in FIG. 8(A), it will cause a combustion ion current, as shown in FIG. 8(B), to be produced. In FIGS. 8(B) to 8(H), solid lines represent parameters when a great number of ions are generated, while broken lines represent parameters when a small number of ions are generated during combustion.

A current, as shown in FIG. 8(C), flows through the electrodes 11 and 12 of the spark plug 1. A voltage drop is produced across the resistor 3 which corresponds to the current in FIG. 8(C) and then inputted to a positive input terminal of the comparator 51. The comparator 51 is connected at a negative input terminal to ground and provides a signal of a high level when the inputted voltage drop represents a positive value. FIG. 8(D) shows an output of the comparator 51. As described in the first embodiment, a negative component of the combustion ion current is usually small, so that rising portions of the current waveform shown in FIG. 8(C) are hardly changed even if the number of ions produced is changed, meaning that the phase of the pulse signal, as shown in FIG. 8(D), outputted from the comparator 51 is shifted only upon reversal from the H-level to the L-level according to a change in number of ions produced.

The output of the comparator 51 is inputted into the integrating circuit 64. The integrating circuit 64 then integrates a signal of the H-level from the comparator 51. When the analog switch 63 resets the capacitor 65 of the integrating circuit 64, the integrating circuit 64 provides an output of zero. FIG. 8(E) shows an output of the oscillator 61 in the form of a pulse signal having a frequency of 300 kHz. FIG. 8(F) shows an output of the counter 62. The counter 62 provides one pulse signal at the H-level every three pulse signals of output from falling of the output of the comparator 51 to the L-level to actuate the analog switch 63. Thus, the integrating circuit 64 provides a corrugated signal of a negative value proportional to the length of time the output of the comparator 51 represents the H-level. The corrugated signal outputted from the integrating circuit 64 is reversed in level by the inverting circuit 66, which is shown in FIG. 8(G). The sample and hold circuit 7 holds the output of the inverting circuit 66 when the output of the comparator 51 is changed from the H-level to the L-level and provides an output signal, as shown in FIG. 8(H). As apparent from the drawing, when the combustion ion current shown in FIG. 8(B) is increased and the timing where the current flowing through the electrodes 11 and 12 of the spark plug 1 is changed from the positive to negative value is delayed, the output of the sample and hold circuit 7 is increased in proportion to the delay time (i.e., a phase difference) from the time when the combustion ion current shows a zero level.

Figure 9A:
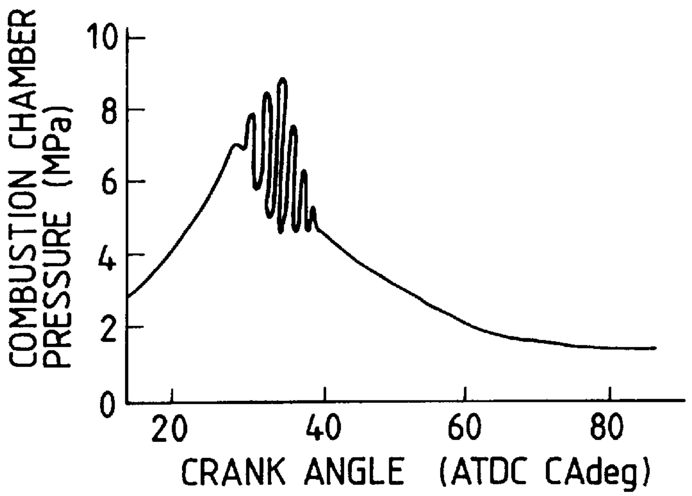
FIG. 9(A) shows a variation in combustion chamber pressure in connection with a crank angle.
Figure 9B:
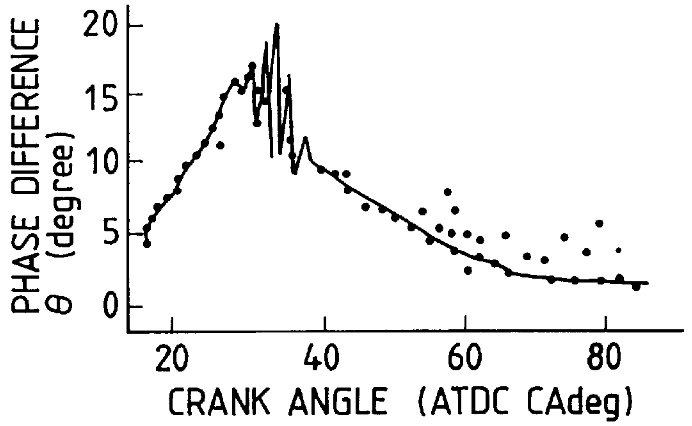
FIG. 9(B) shows an output of a sample and hold circuit 7 shown in FIG. 7, as represented as a phase difference.
Figure 9C:
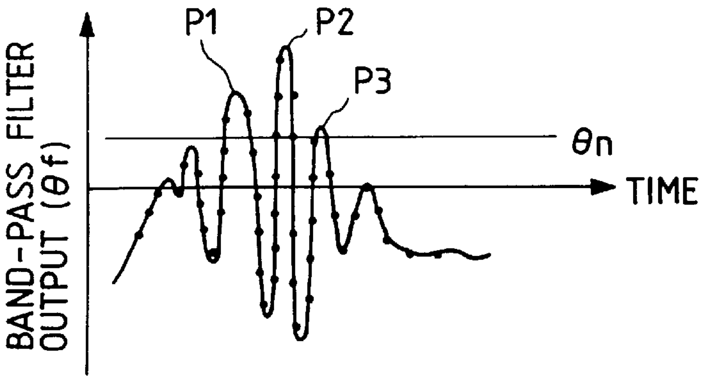
FIG. 9(C) shows an output of a band-pass filter 92 shown in FIG. 7.

FIG. 9(A) shows the relation between a combustion chamber pressure and a crank angle and that the combustion chamber pressure increases until the crank angle reaches a given value and then decreases. FIG. 9(B) shows the output from the sample and hold circuit 7, as represented as the phase difference in connection with the crank angle, and that the phase difference increases until the crank angle reaches a given value and then decreases. As can be seen in the drawings, the phase difference is changed in proportion to the combustion chamber pressure. Specifically, when an abnormal vibration causing combustion knock occurs, as shown in FIG. 9(A), within a range of the crank angle producing high levels of the combustion chamber pressure, it will cause the phase difference to vibrates, as shown in FIG. 9(B). This vibration is detected by the band-pass filter 92 based on the output from the sample and hold circuit 7. In practice, the band-pass filter 92 passes therethrough frequency components of 6 to 8 kHz at which the combustion knock vibration is concentrated and outputs them to the peak hold monitor 93 which are shown in FIG. 9(C). The peak hold monitor 93 fixes a maximum amplitude (i.e., P2 in FIG. 9(C)) of the combustion knock vibration at the end of every combustion cycle and provides it to the electronic control unit 91A as representing a maximum strength of the combustion knock vibration. The electronic control unit 91A compares the maximum amplitude with a given reference value to determine whether the combustion knock is occurring or not.

Figure 10:
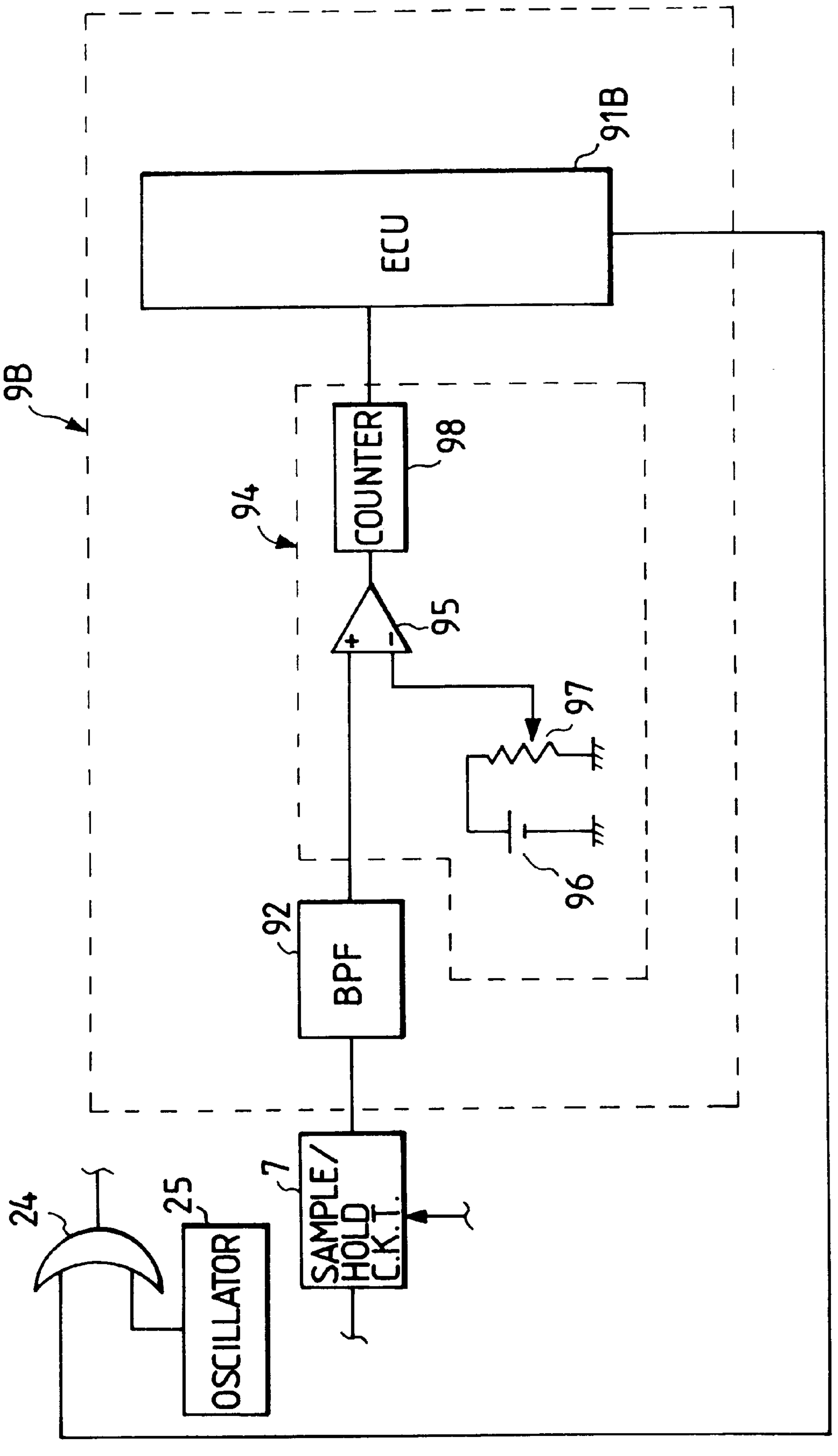
FIG. 10 is a circuit diagram which shows a combustion monitoring apparatus according to the fifth embodiment.

FIG. 10 shows a combustion monitoring apparatus according to the fifth embodiment which is a modification of the fourth embodiment. Only different arrangements and operations will be described below.

An electronic control circuit 9B includes a band-pass filter 92, a combustion knock vibration counting circuit 94, and an electronic control unit 91B.

The combustion knock vibration counting circuit 94 includes a battery 96, a variable resistor 97, a comparator 95, and a counter 98.

An output from the sample and hold circuit 7 representing the phase difference, as shown in FIG. 9(B), is inputted to the band-pass filter 92. The band-pass filter 92 transmits the combustion knock vibration Of, as shown in FIG. 9(C), to a positive terminal of the comparator 95. A negative terminal of the comparator 95 is connected to the variable resistor 97. The variable resistor 97 is connected to the battery 96 and is so adjusted as to provide a voltage drop corresponding to a reference amplitude θn of the combustion knock vibration.

In operation, the comparator 95 compares the output of the band-pass filter 92 representing the combustion knock vibration θf with the reference amplitude θn and provides a high level signal if the combustion knock vibration θf is greater than the reference amplitude θn, while it provides a lower level signal if the combustion knock vibration θf is smaller than the reference amplitude θn. The counter 98 then counts the number of the high level signals outputted from the comparator 95 and provides a count signal indicative thereof. In an example shown in FIG. 9(C), the combustion knock vibration θf exceeds the reference amplitude θn at peaks P1, P2, and P3. Thus, the counter 98 outputs the count signal indicative of three (3) to the electronic control unit 91B. The electronic control unit 91B determines that the combustion knock is occurring if the count signal from the counter 98 indicates a count value greater than or equal to one (1) and also determines a value of the count value multiplied by the reference amplitude θn as the strength of the combustion knock vibration.

Figure 11:
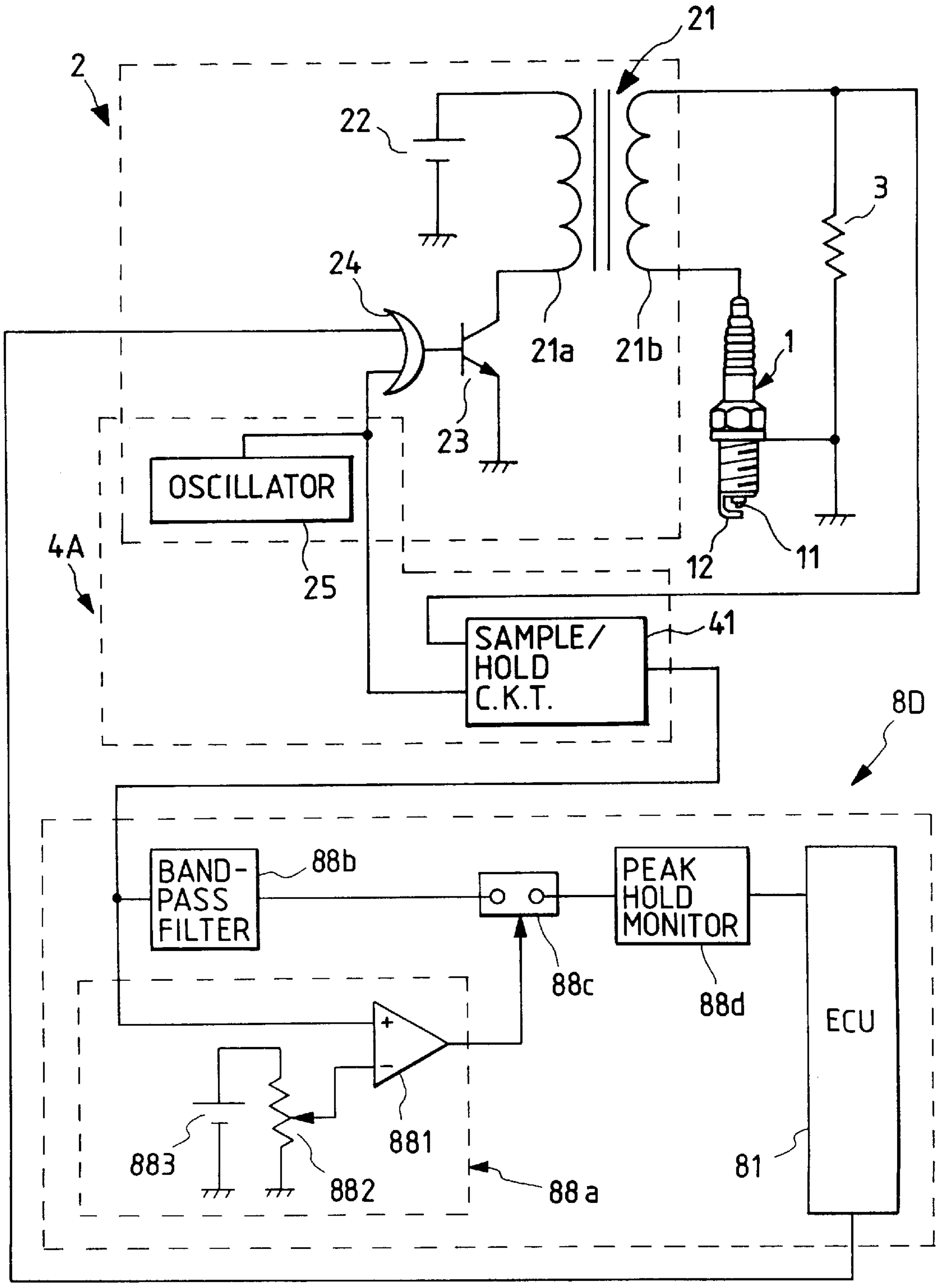
FIG. 11 is a circuit diagram which shows a combustion monitoring apparatus according to the sixth embodiment.

FIG. 11 shows a combustion monitoring apparatus according to the sixth embodiment of the invention which is different from the first embodiment only in an electric control circuit 8D. Other arrangements are identical, and explanation thereof in detail will be omitted here.

The electric control circuit 8D includes an electronic control unit 81, a peak determining circuit 88*a*, a band-pass filter 88*b*, an analog switch 88*c*, and a peak hold monitor 88*d*. The peak determining circuit 88*a* includes a comparator 881, a variable resistor 882, and a battery 883.

The peak values of the combustion ion current during each combustion cycle derived by the sample and hold circuit 41 are inputted to the band-pass filter 88*b*. The band-pass filter 88*b* then extracts therefrom vibrations of 6 to 8 kHz on which the knocking vibration components are concentrated and provide them to the peak hold monitor 88*d* through the analog switch 88*c*. When the analog switch 88*c* is turned on, the peak hold monitor 88*d* holds a maximum value of the vibrations detected by the band-pass filter 92 and provides a signal indicative thereof to the ECU 81. The value held by the peak hold monitor 88*d* is reset at the start of every combustion cycle.

The peak values of the combustion ion current from the sample and hold circuit 41 are also inputted to a positive input terminal of the comparator 881 of the peak determining circuit 88*a*. The comparator 881 is connected at a negative terminal to the variable resistor 882. The variable resistor 882 is so adjusted that a voltage drop of the battery 883 corresponds to an upper limit (hereinafter, referred to as a first threshold value) of variation in peak value of the combustion ion current. The first threshold value is a maximum of the variation in peak value of the combustion ion current indicating the normal combustion. When the peak value of the combustion ion current inputted from the sample and hold circuit 41 is greater than the first threshold value, the comparator 881 outputs a signal of H-level to the analog switch 88*c*. The analog switch 88*s* is maintained turned on as long as the signal of H-level is inputted thereto.

Figure 12A:
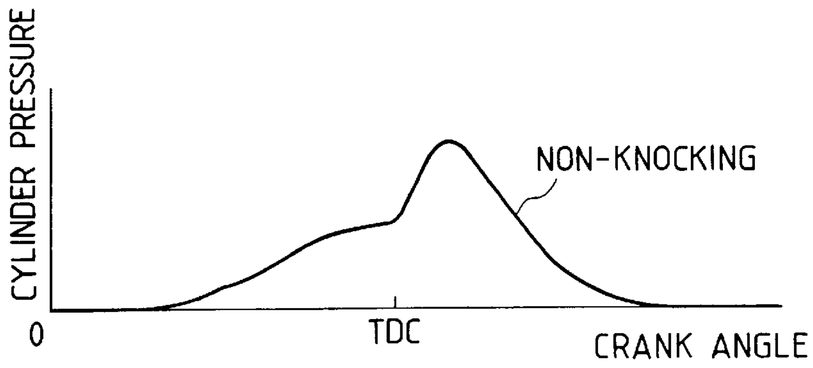
FIG. 12(A) is a graph which shows a variation in pressure in a cylinder of an engine when combustion knock does not occurs.
Figure 12B:
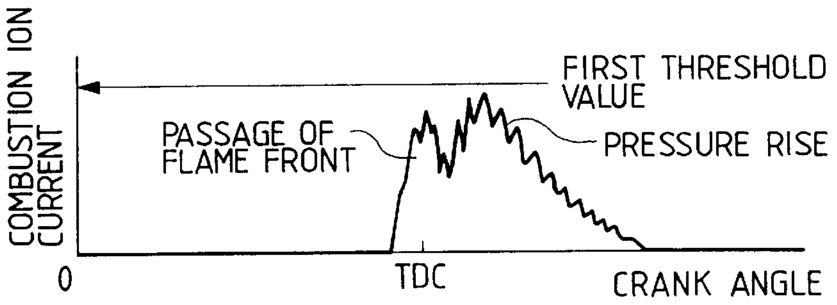
FIG. 12(B) is a graph which shows a variation in combustion ion current when combustion knock does not occur.

FIG. 12(A) shows a variation in pressure of a combustion chamber (hereinafter, referred to as a cylinder pressure) during one combustion cycle under the normal combustion condition. FIG. 12(B) shows a variation in peak value of the combustion ion current indicated by a combustion ion signal provided by the sample and hold circuit 41 which has two peaks: one being produced at a time when a large number of combustion ions are generated by passage of a flame front the top of the central electrode 11 of the spark plug 1, and the second being produced at a time when the density of combustion ions is increased according to an increase in cylinder pressure, as shown in FIG. 12(A). The number of the combustion ions during the normal combustion is however smaller than that during the abnormal combustion or knocking, so that a maximum value of the combustion ion current does not exceed the first threshold value set by the variable resistor 882. The analog switch 88*c* is thus maintained off. The peak hold monitor 88*d* does not provide a held value to the ECU 81. The ECU 81 then determines that the combustion knock is not occurring.

Figure 12C:
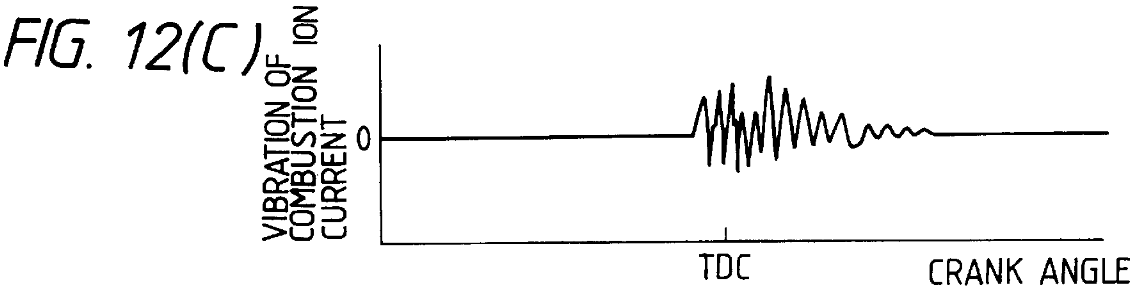
FIG. 12(C) is a graph which shows vibration of a combustion ion current when combustion knock does not occur.

FIG. 12(C) shows a vibration of a signal outputted from the band-pass filter 88*b* (i.e., the combustion ion current). Usually, the knocking vibration does not take place during normal combustion, but the signal outputted from the band-pass filter 88*b* may include the same frequency as that of the knocking vibration due to passage of a flame front through the top of the central electrode 11 of the spark plug 1, which will remain, as shown in the drawings, until the cylinder pressure is increased within a high engine speed range. The combustion monitoring apparatus of this invention is designed to determine the generation of combustion knock based on a maximum value of peaks of the combustion ion current during each combustion cycle, therefore, this determination is not adversely affected by a signal having the same frequency as that of the knocking vibration.

Figure 13A:
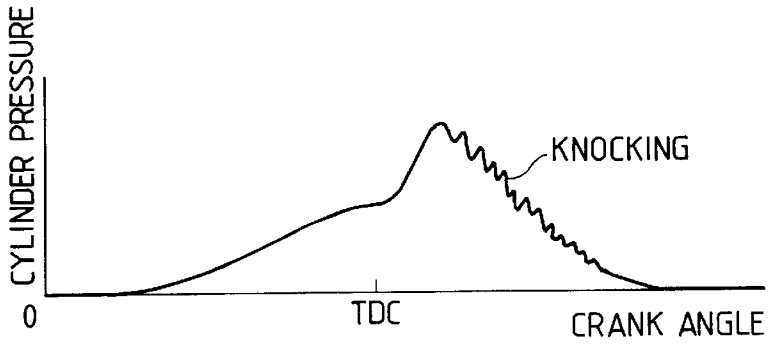
FIG. 13(A) is a graph which shows a variation in pressure in a cylinder of an engine when combustion knock occurs.
Figure 13B:
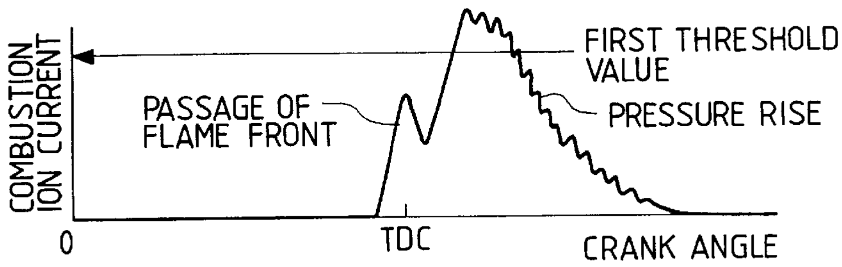
FIG. 13(B) is a graph which shows a variation in combustion ion current when combustion knock occurs.
Figure 13C:
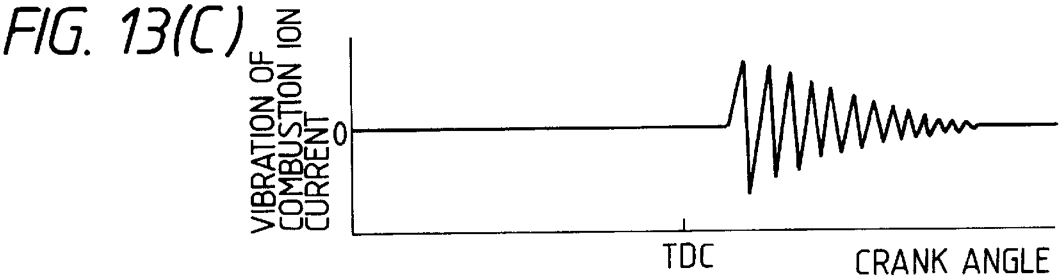
FIG. 13(C) is a graph which shows vibration of a combustion ion current when combustion knock occurs.

FIG. 13(A) shows a variation in cylinder pressure during one combustion cycle when the combustion knock occurs. FIG. 13(B) shows a variation in combustion ion current indicated by the combustion ion signal provided by the sample and hold circuit 41. The combustion ion current exceeds the first threshold value within part of cylinder pressure rising range due to generation of a large amount of combustion ions, thereby causing the analog switch 88*c* to be turned on. The variation in combustion ion current includes a knocking vibration component, as shown in FIG. 13(C), according to the strength of combustion knock. The knocking vibration component shows a greater amplitude during a time when the combustion ion current is greater than the first threshold value. The peak hold monitor 88*d* updates and holds a maximum value of the knocking vibration component provided by the band-pass filter 88*b*, that is, a maximum value of amplitude of the knocking vibration component and outputs it to the ECU 81. The ECU 81 is responsive to input of the knocking vibration component to determine that the combustion knock is occurring and also determines whether the maximum value of the amplitude of the knocking vibration component is greater than a second threshold value or not that is a reference value for classifying the amplitude of the knocking vibration component according to the degree or strength of combustion knock. For example, a control variable of feedback control may be switched between two values according to the strength of the combustion knock.

If the maximum value of the amplitude of the knocking vibration component exceeds the second threshold value, it is determined that the strength of the combustion knock is great.

Figure 14:
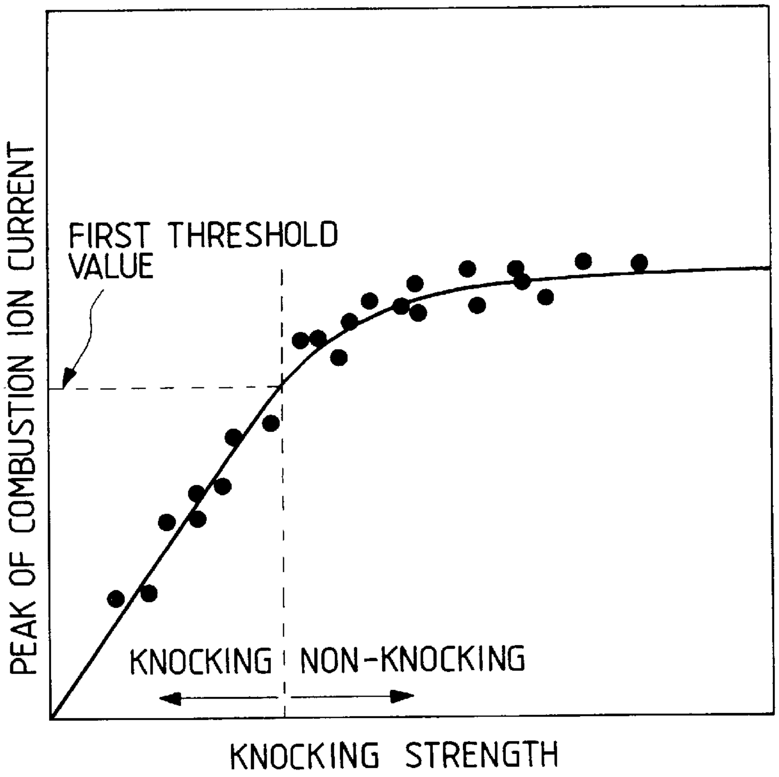
FIG. 14 is a graph which shows the relation between the strength of combustion knock and a maximum value of peaks of a combustion ion current.

FIG. 14 shows the relation between the strength of combustion knock and a maximum value of peaks of the combustion ion current. The maximum value of peaks of the combustion ion current during knocking is clearly smaller than that when the knocking does not occur. Thus, by using this relation, the determination of whether the combustion knock is occurring or not may be made.

Figure 15:
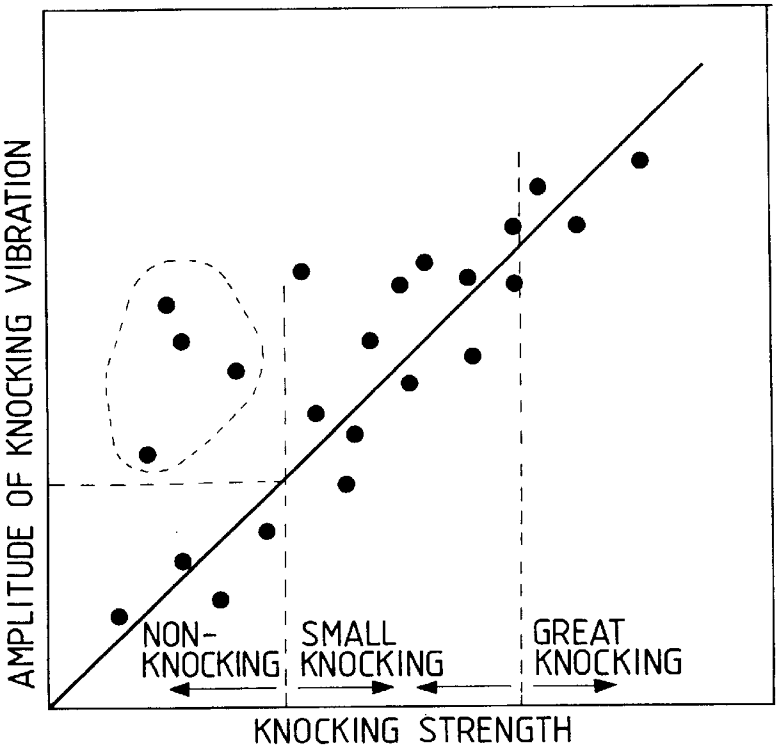
FIG. 15 is a graph which shows the relation between the strength of combustion knock and the amplitude of vibration within the same frequency range as that of knocking vibration.

FIG. 15 shows the relation between the strength of combustion knock and the amplitude of vibration within the same frequency range as that of the knocking vibration indicated by the variation in combustion ion current. The amplitude of the knocking vibration is, as can be seen from the drawing, roughly proportional to the strength of the combustion knock during knocking. Thus, by using this relation, the strength of the combustion knock may be determined precisely. The vibration, as shown in FIG. 12(*c*), which corresponds to a variation in amplitude as enclosed by a broken line in FIG. 15 appears at an output of the band-pass filter 88*b* during normal combustion, but it exerts no effect on the determinations of generation and strength of the combustion knock.

Figure 16:
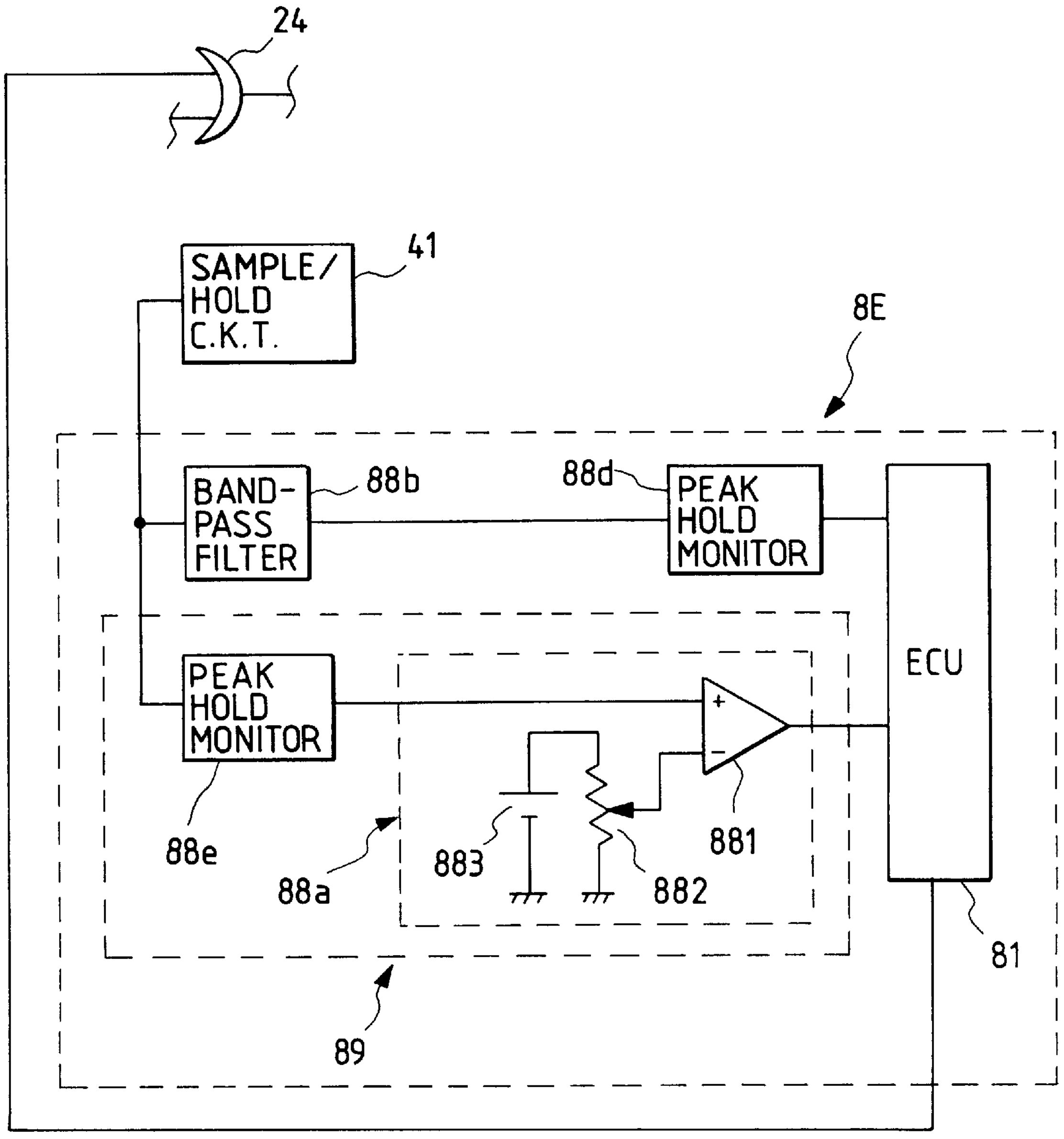
FIG. 16 is a circuit diagram which shows a combustion monitoring apparatus according to the seventh embodiment.

FIG. 16 shows a combustion monitoring apparatus according to the seventh embodiment of the invention which is different from the one shown in FIG. 11 only in structure of an electric control circuit 8E. Other circuit arrangements are identical, and explanation thereof in detail will be omitted here.

The electric control circuit 8E includes an upper limit comparing circuit 89. The upper limit comparing circuit 89 includes a peak hold monitor 88*e* which updates and holds a maximum value of peaks of the combustion ion current outputted from the sample and hold circuit 41 and provides it to the positive terminal of the comparator 881. The band-pass filter 88*b* is connected directly to the peak hold monitor 88*d*.

In operation, a maximum value of amplitude of a vibration within a frequency range of the knocking vibration component during one combustion cycle is inputted to the ECU 81 regardless of the combustion knock since the analog switch 88*c* is not provided between the band-pass filter 88*b* and the peak hold monitor 88*d*. If a maximum value of peaks of the combustion ion current is greater than the first threshold value as shown in FIG. 13(B), then a signal of H-level is inputted to the ECU 81. Alternatively, if it is smaller than the first threshold value, then a signal of L-level is inputted to the ECU 81. The ECU 81 is responsive to the signal of the H-level to determine that the combustion knock is occurring, while it is responsive to the signal of the L-level to determine that the combustion knock is not occurring. When the combustion knock is occurring, a maximum value of amplitude of the knocking vibration component outputted from the peak hold monitor 88*d* is compared with the second threshold value to determine the strength of the combustion knock.

Figure 17:
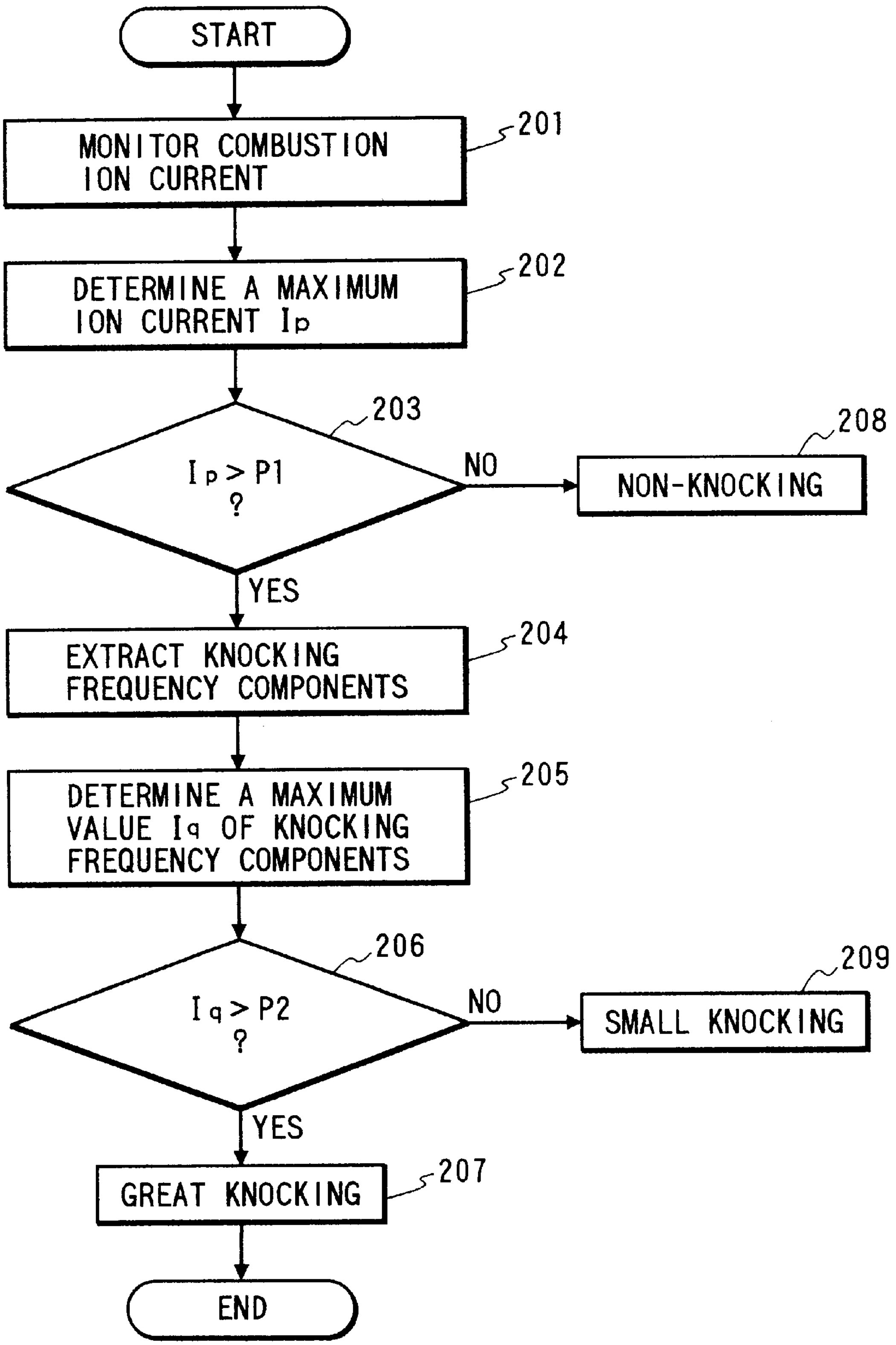
FIG. 17 is a flowchart of a program performed by a combustion monitoring apparatus according to the eighth embodiment.

FIG. 17 shows a program executed by the electric control circuit 8E every combustion cycle according to the eighth embodiment of the invention which includes an interface performing an A/D conversion on peaks of the combustion ion current outputted from the sample and hold circuit 41 and a DSP processing the peaks of the combustion ion current which are A/D-converted.

After entering the program, the routine proceeds to step 201 wherein the combustion ion current is monitored to store variation or peaks thereof for one combustion cycle. The routine proceeds to step 202 wherein a maximum value Ip of the peaks derived in step 201 is determined. The routine proceeds to step 203 wherein it is determined whether the maximum value Ip is greater than the fist threshold value P1 or not. If a NO answer is obtained, then the routine proceeds to step 208 wherein it is determined that the engine is not knocking. Alternatively, if a YES answer is obtained, then the routine proceeds to step 204 wherein a frequency component within a range of 6 to 8 kHz (i.e., a knocking frequency component) on which knocking vibrations are concentrated are extracted from the peaks of the combustion ion current stored in step 201. The routine proceeds to step 205 wherein a maximum value Iq of the knocking frequency component is determined.

The routine proceeds to step 206 wherein it is determined whether the maximum value Iq is greater than the second threshold value P2 or not. If a NO answer is obtained, then the routine proceeds to step 209 wherein the combustion knock shows a smaller strength. Alternatively, if a YES answer is obtained, then the routine proceeds to step 207 wherein the combustion knock shows a greater strength.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, the strength of the combustion knock is indicated by two levels in the sixth to eighth embodiments, however, it may be indicated by three or more levels. Further, the combustion ion signal is provided to derive peaks of the combustion ion current in the first to third embodiment and sixth to eighth embodiments, while the combustion ion signal is provided to derive the phase difference of the combustion ion current in the other embodiments, however, each embodiment may use either type of the combustion ion signal.

What is claimed is:

1. A combustion monitoring apparatus for an internal combustion engine comprising:

voltage source means for applying an ac voltage across plug electrodes of a spark plug mounted in a combustion chamber of the engine during combustion;

current detecting means for detecting a current flowing through the plug electrodes of the spark plug;

current variation determining means for determining a variation in the current detected by said current detecting means caused by a variation in number of combustion ions produced between the plus electrodes of the spark plug; and combustion condition distinguishing means for distinguishing an abnormal combustion condition from a normal combustion condition based on the variation in the current determined by said current variation determining means;

wherein said combustion condition distinguishing means includes maximum value determining means for determining a maximum value of the variation in the current detected by said current detecting means during a combustion cycle, time measuring means for measuring a time from generation of the current detected by said current detecting means until the variation in the current is decreased to a given value, and combustion knock determining means for determining that combustion knock is occurring if a quotient of the maximum value of the variation divided by the time measured by said time measuring means is greater than a predetermined value.

2. A combustion monitoring apparatus for an internal combustion engine comprising:

voltage source means for applying an ac voltage across plug electrodes of a spark plug mounted in a combustion chamber of the engine during combustion;

current detecting means for detecting a current flowing through the plug electrodes of the spark plug;

current variation determining means for determining a variation in the current detected by said current detecting means caused by a variation in number of combustion ions produced between the plug electrodes of the spark plug; and combustion condition distinguishing means for distinguishing an abnormal combustion condition from a normal combustion condition based on the variation in the current determined by said current variation determining means;

wherein said combustion condition distinguishing means includes maximum attenuation rate determining means for determining a maximum value of an attenuation rate of the variation in the current detected by said current detecting means during a combustion cycle and combustion knock determining means for determining that combustion knock is occurring if the maximum value of the attenuation rate is greater than a predetermined value.

3. A combustion monitoring apparatus for an internal combustion engine comprising:

a voltage source applying an ac voltage across plug electrodes of a spark plug mounted in a combustion chamber of the engine;

a current detecting element detecting a current flowing through the plug electrodes of the spark plug to provide a current signal indicative thereof;

a combustion ion detecting element extracting a combustion ion current component out of the current signal provided by said current detecting element by removing a capacitive current component produced according to the ac voltage provided by said voltage source to provide a combustion ion signal according to the amount of combustion ions existing between the plug electrodes; and a combustion analyzing circuit analyzing a combustion condition of the engine based on a variation in combustion ion signal provided by said combustion ion detecting element.

4. A combustion monitoring apparatus as set forth in claim 3, wherein said combustion analyzing circuit includes a knocking vibration detector detecting from the combustion ion signal a vibration within a frequency range of combustion knock vibrations, an upper limit comparator comparing the combustion ion signal with a given upper limit to determine whether the combustion ion signal is greater than the given upper limit or not, a knocking amplitude maximum value determining circuit determining a maximum value of amplitude of the vibration detected by said knocking vibration detector within a period of time including at least a period of time during which the combustion ion current exceeds the given upper limit, and a knocking determining circuit determining that combustion knock is occurring when the upper limit comparator determines that the combustion ion signal is greater than the given upper limit for determining the strength of the combustion knock based on the maximum value of the amplitude of the vibration determined by said knocking amplitude maximum value determining circuit.

5. A combustion monitoring apparatus for an internal combustion engine comprising:

a voltage source applying an ac voltage across plug electrodes of a spark plug mounted in a combustion chamber of the engine;

current detecting means for detecting a current flowing through the plug electrodes of the spark plug to provide a current signal indicative thereof;

current variation determining means for determining a variation in the current detected by said current detecting means caused by a variation in the number of combustion ions produced between the plug electrodes of the spark plug;

combustion condition distinguishing means for distinguishing an abnormal combustion condition from a normal combustion condition based on the variation in the current determined by said current variation determining means;

a combustion ion detecting element extracting a combustion ion current component out of the current signal provided by said current detecting means by removing a capacitive current component produced according to the ac voltage provided by said voltage source to provide a combustion ion signal according to the amount of combustion ions existing between the plug electrodes; and a combustion analyzing circuit analyzing a combustion condition of the engine based on a variation in the combustion ion signal provided by said combustion ion detecting element.

6. A combustion monitoring apparatus as set forth in claim 5, wherein said combustion condition distinguishing means includes maximum value determining means for determining a maximum value of the variation in the current detected by said current detecting means during a combustion cycle, comparing means for comparing the maximum value determined by said maximum value determining means with a given value, and misfire determining means for determining that a misfire has occurred if the maximum value is smaller than the given value.

7. A combustion monitoring apparatus as set forth in claim 5, wherein said combustion condition distinguishing means includes time measuring means for measuring a time from generation of the current detected by said current detecting means until the variation in the current is decreased to a given value and blowout determining means for determining that a flame has been blown out before combustion is completed if the time measured by the time measuring means is shorter than a given time period.

8. A combustion monitoring apparatus as set forth in claim 5, wherein said combustion condition distinguishing means includes maximum value determining means for determining a maximum value of the variation in the current detected by said current detecting means during a combustion cycle and combustion knock determining means for determining that combustion knock is occurring if the maximum value of the variation in the current is greater than a predetermined value.

9. A combustion monitoring apparatus as set forth in claim 5, wherein said combustion condition distinguishing means includes knocking vibration detecting means for detecting a knocking vibration component caused by combustion knock from the variation in the current determined by said current variation determining means to determine a maximum amplitude of the knocking vibration component and combustion knock determining means for determining that combustion knock is occurring if the maximum amplitude is greater than a predetermined amplitude.

10. A combustion monitoring apparatus as set forth in claim 5, wherein said combustion condition distinguishing means includes knocking vibration detecting means for detecting a knocking vibration component from the variation in the current determined by said current variation determining means, caused by combustion knock to count the number of times peaks of the knocking vibration component exceeds a given amplitude during a combustion cycle and combustion knock determining means for determining that combustion knock is occurring if the number of times counted is greater than a given number.

11. A combustion monitoring apparatus for an internal combustion engine comprising:

a voltage source applying an ac voltage across plug electrodes of a spark plug mounted in a combustion chamber of the engine, the voltage source including an oscillator for providing an oscillation signal, wherein (i) the oscillation signal has a high level and a low level, and (ii) the voltage source applies the ac voltage across the electrodes in accordance with the high level and the low level of the oscillation signal;

a current detecting element detecting a current flowing through the plug electrodes of the spark plug to provide a current signal indicative thereof;

a combustion ion detecting element extracting a combustion ion current component out of the current signal provided by the current detecting element by removing a capacitive current component produced according to the ac voltage provided by the voltage source to provide a combustion ion signal according to an amount of combustion ions existing between the plug electrodes, wherein the combustion ion detecting element includes a sample and hold circuit for holding the current signal when the oscillation signal is changed to the low level; and a combustion analyzing circuit analyzing a combustion condition of the engine based on a variation in combustion in the combustion ion signal provided by the combustion ion detecting element.

12. A combustion monitoring apparatus as set forth in claim 11, wherein the combustion analyzing circuit includes a knocking vibration detector detecting from the combustion ion signal a vibration within a frequency range of combustion knock vibrations, an upper limit comparator comparing the combustion ion signal with a given upper limit to determine whether the combustion ion signal is greater than the given upper limit or not, a knocking amplitude maximum value determining circuit determining a maximum value of amplitude of the vibration detected by the knocking vibration detector within a period of time including at least a period of time during which the combustion ion current exceeds the given upper limit, and a knocking determining circuit determining that combustion knock is occurring when the upper limit comparator determines that the combustion ion signal is greater than the given upper limit for determining the strength of the combustion knock based on the maximum value of the amplitude of the vibration determined by the knocking amplitude maximum value determining circuit.

* * * * *